United States Patent
Hirato

(10) Patent No.: US 11,009,731 B2
(45) Date of Patent: May 18, 2021

(54) LIQUID CRYSTAL PANEL

(71) Applicant: SHARP KABUSHIKI KAISHA, Sakai (JP)

(72) Inventor: Shinichi Hirato, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/842,358

(22) Filed: Apr. 7, 2020

(65) Prior Publication Data
US 2020/0326575 A1    Oct. 15, 2020

(30) Foreign Application Priority Data

Apr. 9, 2019   (JP) .............................. JP2019-074115

(51) Int. Cl.
  *G02F 1/1333*   (2006.01)
  *G02F 1/1337*   (2006.01)
  *G02F 1/1339*   (2006.01)

(52) U.S. Cl.
  CPC .... *G02F 1/133345* (2013.01); *G02F 1/13394* (2013.01); *G02F 1/133788* (2013.01)

(58) Field of Classification Search
  CPC ........... G02F 1/13394; G02F 1/133345; G02F 2001/13396; G02F 1/133788
  See application file for complete search history.

(56) References Cited

U.S. PATENT DOCUMENTS

| | | | | |
|---|---|---|---|---|
| 6,144,435 | A  * | 11/2000 | Yokoyama | ........ G02F 1/133514 349/122 |
| 7,414,354 | B2 * | 8/2008  | Kishimoto | .............. B32B 13/12 313/110 |
| 7,550,771 | B2 * | 6/2009  | Nagata | .............. H01L 29/78603 257/347 |
| 2008/0185587 | A1* | 8/2008 | Whangbo | ........... H01L 27/1218 257/59 |
| 2020/0059019 | A1* | 2/2020 | Li | ........................ H01R 31/065 |

FOREIGN PATENT DOCUMENTS

JP           2006-184721 A       7/2006

* cited by examiner

*Primary Examiner* — Dung T Nguyen
(74) *Attorney, Agent, or Firm* — ScienBiziP, P.C.

(57) ABSTRACT

A liquid crystal panel includes: a liquid crystal layer; a pair of substrates that hold the liquid crystal layer between the pair of substrates; a spacer that is formed so as to protrude from one substrate of the pair of substrates toward the other substrate of the pair of substrates and comes into contact with the other substrate to keep a distance between the pair of substrates; and an overcoat film that is arranged in the one substrate on a lower layer side of the spacer and is configured so that a gap between a lowest position and a highest position of fine irregularities generated in a reference range on a surface is 4 nm or less.

3 Claims, 18 Drawing Sheets

FIG. 13

|  | COMPARATIVE EXAMPLE | EXAMPLE |
|---|---|---|
| Rq (nm) | 1.13 | 0.583 |
| Ra (nm) | 0.592 | 0.462 |
| ASSUMED SURFACE AREA ($\mu m^2$) | 25 | 25 |
| ACTUALLY MEASURED SURFACE AREA ($\mu m^2$) | 25.02625 | 25.01775 |
| SURFACE AREA INCREASE RATE (%) | 0.105 | 0.071 |

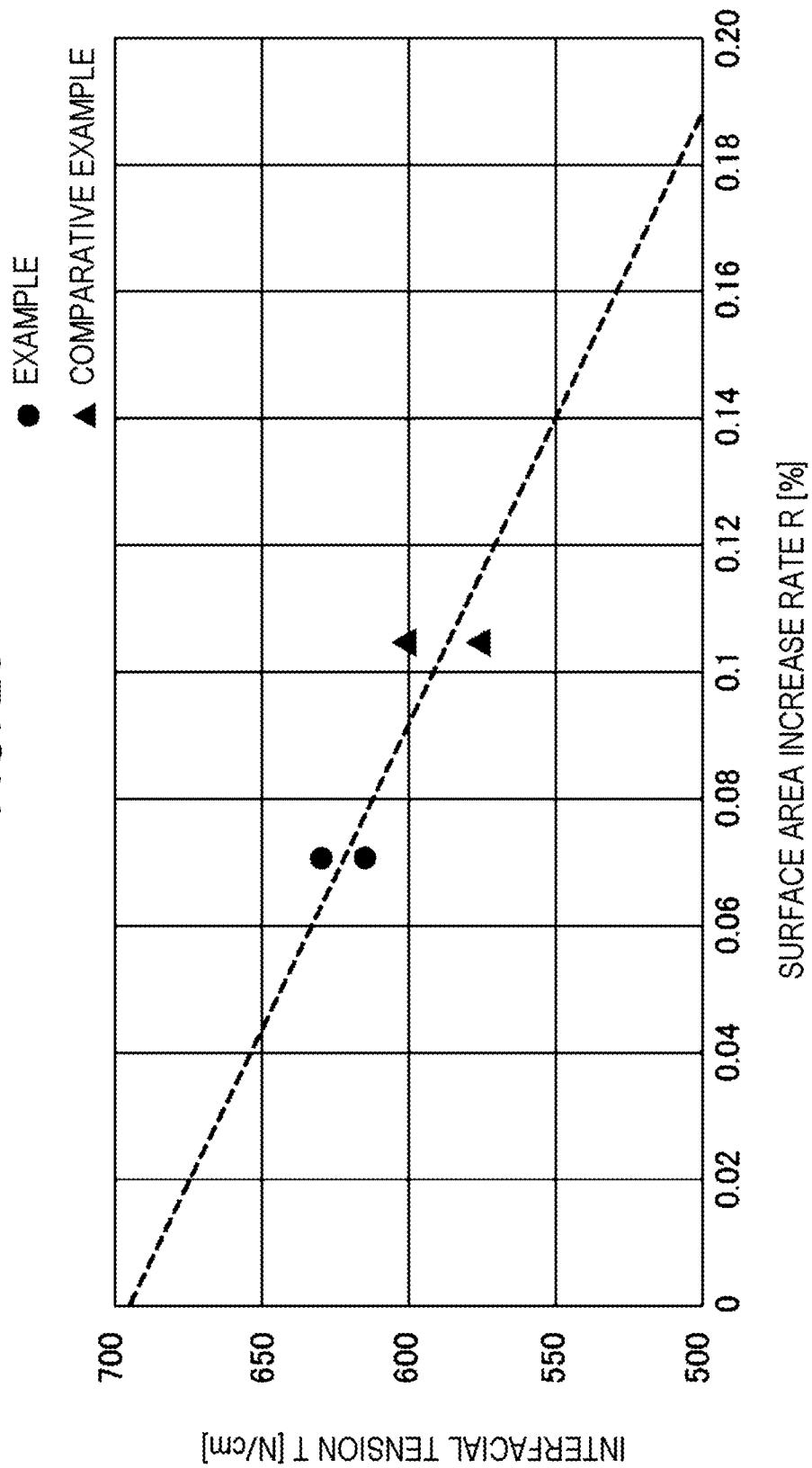

LIQUID CRYSTAL PANEL

BACKGROUND

1. Field

The present disclosure relates to a liquid crystal panel.

2. Description of the Related Art

A liquid crystal panel that is described in Japanese Unexamined Patent Application Publication No. 2006-184721 described below is known as an example of a conventional liquid crystal panel. The liquid crystal panel includes a substrate with multiple imposition for a color filter, which has a substrate in a rectangular shape each side of which is one meter or more, coloring layers respectively formed on a plurality of pixel regions of the substrate, and a plurality of columnar spacers formed on each of the pixel regions of the substrate. In the substrate with multiple imposition for a color filter, when it is assumed that an area of each of the pixel regions is 1, a total area of upper bottom surfaces of the columnar spacers in the pixel region is set to be within a range of 0.0002 to 0.0006.

According to the liquid crystal panel described in Japanese Unexamined Patent Application Publication No. 2006-184721, when a ratio of the area of the upper bottom surfaces of the columnar spacers to that of the pixel region is set to be within the range of the aforementioned numerical values, gravity-originated unevenness that is caused when liquid crystal in a liquid crystal layer runs downward is not to be generated. However, a problem of the gravity-originated unevenness is not necessarily solved thoroughly, even when the ratio of the area of the upper bottom surfaces is within the above-described range of the numerical values related to an area ratio of the spacers. For example, depending on a state of a surface in an interface between the substrate and the liquid crystal layer that constitute the liquid crystal panel, there is a possibility that the problem of the gravity-originated unevenness is not solved.

The disclosure is accomplished on the basis of the above-described circumstances, and solves a problem of a liquid crystal pool.

SUMMARY

An embodiment of the disclosure is a liquid crystal panel including a liquid crystal layer, a pair of substrates that hold the liquid crystal layer between the pair of substrates, a spacer that is formed so as to protrude from one substrate of the pair of substrates toward an other substrate of the pair of substrates and comes into contact with the other substrate to keep a distance between the pair of substrates, and an overcoat film that is arranged in the one substrate on a lower layer side of the spacer and is configured so that a gap between a lowest position and a highest position of fine irregularities generated in a reference range on a surface is 4 nm or less.

BRIEF DESCRIPTION OF THE DRAWINGS

FIG. 13 is a view illustrating a table in which numerical values related to surface roughness and surface areas of the comparative example and the example in the comparative experiment 1 are summarized;

FIG. 20 is a view illustrating a relationship between surface area increase rates and interfacial tension of the comparative example and the example of the comparative experiment 2.

DESCRIPTION OF THE EMBODIMENTS

Embodiment

An embodiment of the disclosure will be described with reference to FIGS. 1 to 20. In the present embodiment, a liquid crystal panel 10 is exemplified. The liquid crystal panel 10 displays an image by using light from a backlight device (lighting device). Note that, an X-axis, a Y-axis, or a Z-axis is indicated in a part of the figures so that a direction of each axis coincides with a direction indicated in each of the figures. An upper side and a lower side respectively indicate a front side and a rear side in, for example, FIGS. 1 and 2.

Figure 1:
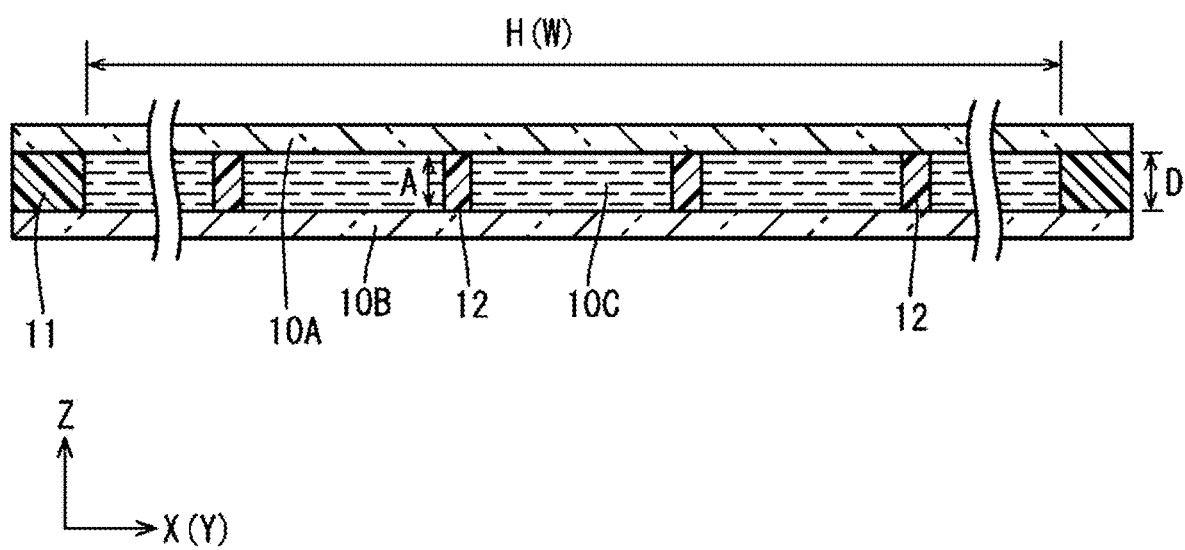
FIG. 1 is a schematic sectional view of a liquid crystal panel according to an embodiment of the disclosure.

FIG. 1 is a schematic sectional view of the liquid crystal panel 10. As illustrated in FIG. 1, the liquid crystal panel 10 includes at least a pair of substrates 10A and 10B and a liquid crystal layer 10C that is held between the pair of substrates 10A and 10B. Various films are formed and laminated on an inner surface side of a transparent glass substrate in each of the pair of substrates 10A and 10B. A front side one of the pair of substrates 10A and 10B is set as a CF substrate (one substrate, counter substrate) 10A and a rear side (back side) one is set as an array substrate (the other substrate, active matrix substrate, TFT substrate) 10B. The liquid crystal layer 10C is formed of a liquid crystal material including a liquid crystal molecule that is a substance optical characteristics of which change in accordance with application of an electric field. The liquid crystal material constituting the liquid crystal layer 10C according to the present embodiment is a liquid crystal material (positive liquid crystal material) anisotropy of a dielectric constant of which is positive. The liquid crystal panel 10 according to the present embodiment has a rectangular shape, and, for example, a direction of long sides of the pair of substrates 10A and 10B coincides with an X-axis direction in each figure, a direction of short sides thereof coincides with a Y-axis direction in each figure, and a direction of thicknesses thereof (direction normal to plate surfaces) coincides with a Z-axis direction in each figure.

As illustrated in FIG. 1, the liquid crystal panel 10 is provided with a sealing unit 11 that is interposed between outer peripheral ends of the pair of substrates 10A and 10B so as to surround the liquid crystal layer 10C, and spacers 12 that are arranged closer to a center than the sealing unit 11 and interposed between center portions of the pair of substrates 10A and 10B. The sealing unit 11 is formed of, for example, an ultraviolet-curable resin material, a thermosetting resin material, or the like, and has a frame-like shape so as to seal the liquid crystal layer 10C held between the pair of substrates 10A and 10B. The spacers 12 are provided in the CF substrate 10A of the pair of substrates 10A and 10B. Each of the spacers 12 is formed in a substantially columnar shape which protrudes from the CF substrate 10A toward an array substrate 10B side while penetrating the liquid crystal layer 10C, and protruding tip surfaces of the spacers 12 come into contact with an inner surface of the array substrate 10B, so that a distance D between the pair of substrates 10A and 10B, that is, a thickness (cell gap) of the liquid crystal layer 10C is maintained. The thickness of the liquid crystal layer 10C which is maintained by the spacers 12 may be, for example, about 2 μm to 5 μm, but is not necessarily limited thereto. Hereinafter, it is set that an inside dimension in a long-side direction (X-axis direction) of the liquid crystal panel 10 is a length dimension (height dimension) H and an inside dimension in a short-side direction (Y-axis direction) of the liquid crystal panel 10 is a width dimension W. Note that, the aforementioned "inside dimension of the liquid crystal panel 10" means a dimension between end surfaces of an inner peripheral side of the sealing unit 11, that is, an outside dimension of the liquid crystal layer 10C.

Figure 2:
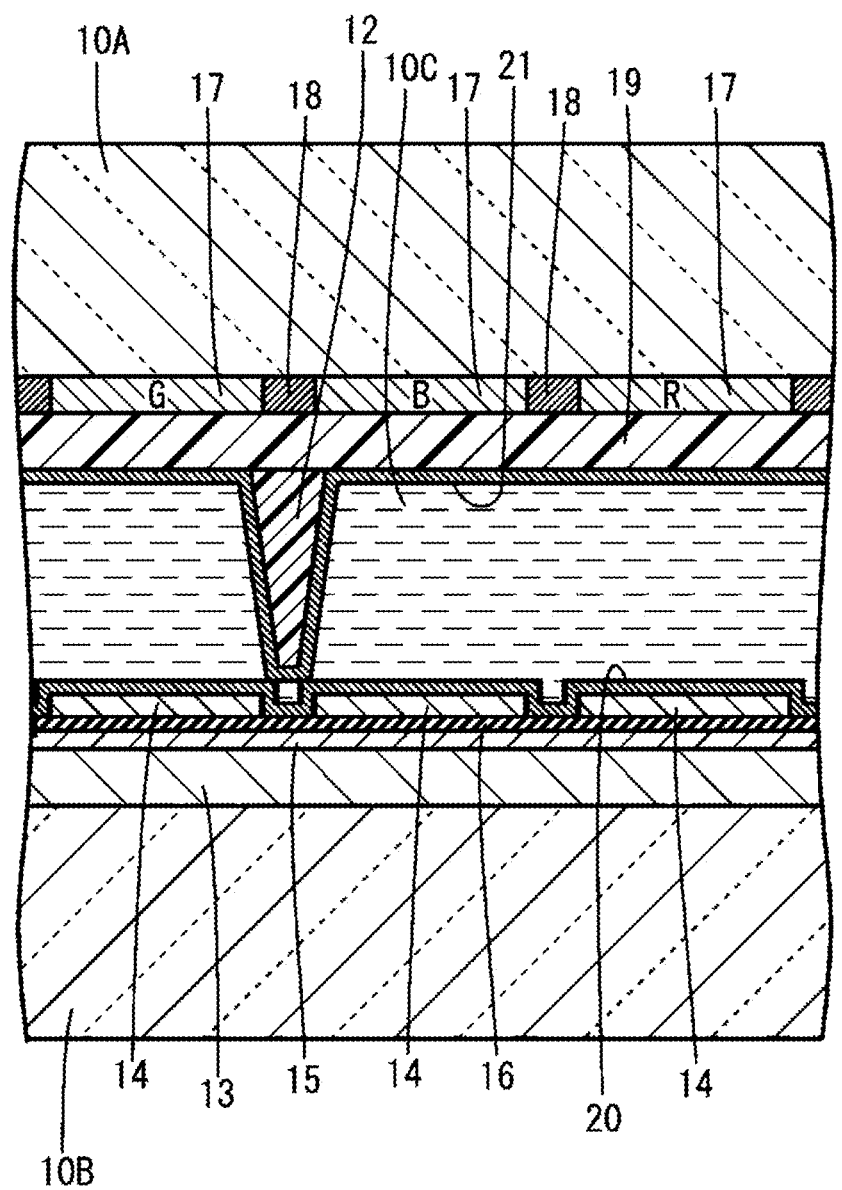
FIG. 2 is a sectional view in a display region of the liquid crystal panel.

Next, an inner structure of the liquid crystal panel 10 will be described with reference to FIG. 2. FIG. 2 is a sectional view in a display region of the liquid crystal panel 10, in which an image is displayed. In FIG. 2, illustration of various structures according to the inner structure of the liquid crystal panel 10 is simplified. As illustrated in FIG. 2, in the display region on an inner surface side of the array substrate 10B, at least a pixel circuit unit 13, pixel electrodes 14, and a common electrode 15 are provided. The pixel circuit unit 13 includes at least gate wires (scanning wires) that transmit a scanning signal, source wires (signal wires) that transmit an image signal, and thin film transistors (TFTs) each of which is a switching element connected to a gate wire and a source wire. The gate wire is formed by a metal film (first metal film) and extends along the X-axis direction, and a large number of gate wires are arranged side by side along the Y-axis direction with an interval therebetween. The source wire is formed by a metal film (second metal film) arranged on an upper layer side of the gate wire with a gate insulating film interposed therebetween and extends along the Y-axis direction, and a large number of source wires are arranged side by side along the X-axis direction with an interval therebetween. Each of the TFTs has a known configuration that has a channel unit, which is formed of a semiconductor film, and the like, and is connected to the pixel electrode 14. The TFT is driven on the basis of the scanning signal transmitted by the gate wire, supplies the image signal, which is transmitted by the source wire, to the pixel electrode 14 via the channel unit, and charges the pixel electrode 14 at a predetermined potential. The TFT and the pixel electrode 14 are arranged in a region surrounded by the gate wires and the source wires, and a large number of TFTs and a large number of pixel electrodes 14 are arranged side by side in a matrix along each of the X-axis direction and the Y-axis direction. The pixel electrode 14 is formed of a transparent electrode film. The common electrode 15 is formed of a transparent electrode film similarly to the pixel electrode 14 and arranged on a lower layer side of the pixel electrode 14 with an insulating film between transparent electrode films (interlayer insulating film) 16 interposed therebetween. The common electrode 15 has a flat shape extending over an entire area of the display region and is arranged so as to overlap with all the pixel electrodes 14. A common potential (reference potential) which is almost constant is supplied to the common electrode 15 by the pixel circuit unit 13. An electric field that is generated on the basis of a potential difference between the pixel electrode 14 and the common electrode 15 includes a fringe electric field (oblique electric field) which includes a component in the direction normal to the plate surface of the array substrate 10B in addition to a component along the plate surface of the array substrate 10B. Accordingly, the liquid crystal panel 10 is set as a so-called FFS (fringe field switching) mode one that controls an alignment state of liquid crystal molecules included in the liquid crystal layer 10C with use of the fringe electric field.

Next, an inner structure of the CF substrate 10A will be described. As illustrated in FIG. 2, in the display region on an inner surface side of the CF substrate 10A, a large number of color filters 17 are provided at positions respectively overlapping with the pixel electrodes 14. The color filters 17 are arranged so that three colors that represent red (R), green (G), and blue (B) are repeatedly and alternately arrayed along the X-axis direction, and extend along the Y-axis direction, and are thus arrayed in stripes as a whole. On the inner surface side of the CF substrate 10A, a light shielding unit (black matrix) 18 is provided in order to, for example, partition adjacent color filters 17 and thereby prevent colors from being mixed. The light shielding unit 18 has a lattice shape so as to overlap with the gate wires and the source wires in the display region. On an upper layer side of the color filters 17 and the light shielding unit 18, an overcoat film 19 is formed. The overcoat film 19 is provided in a substantially flat shape over an almost entire area of the CF substrate 10A, and has a film thickness of, for example, about 1.5 μm. The overcoat film 19 has a function of planarizing a level difference generated on a lower layer side than the overcoat film 19. On an upper layer side of the overcoat film 19, the spacers 12 already described above are provided. The spacers 12 are formed of, for example, a resin material having a light transmitting property, and protrude from a surface of the overcoat film 19 toward the array substrate 10B side along the Z-axis direction. While having the light transmitting property, the spacer 12 is likely to disturb alignment of the liquid crystal material in a vicinity of the spacer 12, so that the spacer 12 may be arranged so as to overlap with the light shielding unit 18 or various wires (light shielding structures) on the array substrate 10B side, but is not necessarily limited thereto. The spacers 12 may be regularly arranged in the plate surface of the CF substrate 10A, but are not necessarily limited thereto.

As illustrated in FIG. 2, an array-side optical alignment film 20 and a CF-side optical alignment film (optical alignment film) 21 that align the liquid crystal molecules included in the liquid crystal layer 10C are respectively provided in innermost surfaces of the substrates 10B and 10A, which are in contact with the liquid crystal layer 10C. The array-side optical alignment film 20 and the CF-side optical alignment film 21 are respectively formed on the substrates 10B and 10A so as to be in a flat shape at least over an almost entire area of the display region, and a thickness of each of the array-side optical alignment film 20 and the CF-side optical alignment film 21 is set to be about 100 nm, for example. Each of the array-side optical alignment film 20 and the CF-side optical alignment film 21 is formed of an optical alignment film material of a photodecomposition type, for example, such as a polyimide, and, when linearly polarized light having a specific wavelength region (for example, an ultraviolet region) is radiated, a polymer chain contained in the optical alignment film material is decomposed and anisotropy is exhibited, so that the liquid crystal molecules are able to be aligned. Specifically, in the present embodiment, optical alignment treatment in which linearly polarized light of an ultraviolet region, a wavelength of which is set to be 254 nm, is radiated with use of a wire grid polarizer so that a total dose is about 250 mJ/mm$^2$ and treatment in which, after the radiation, liquid crystal is baked for about 30 minutes in a temperature environment of about 230° C. to be aligned are performed for the array-side optical alignment film 20 and the CF-side optical alignment film 21. The array-side optical alignment film 20 is arranged on an upper layer side of the pixel electrodes 14 and the insulating film between transparent electrode films 16 and covers the pixel electrodes 14 and the insulating film between transparent electrode films 16 from the upper layer side over an entire area at least in the display region. The CF-side optical alignment film 21 is arranged on an upper layer side of the overcoat film 19 and the spacers 12 and covers the overcoat film 19 and the spacers 12 from the upper layer side over an entire area at least in the display region.

Figure 3:
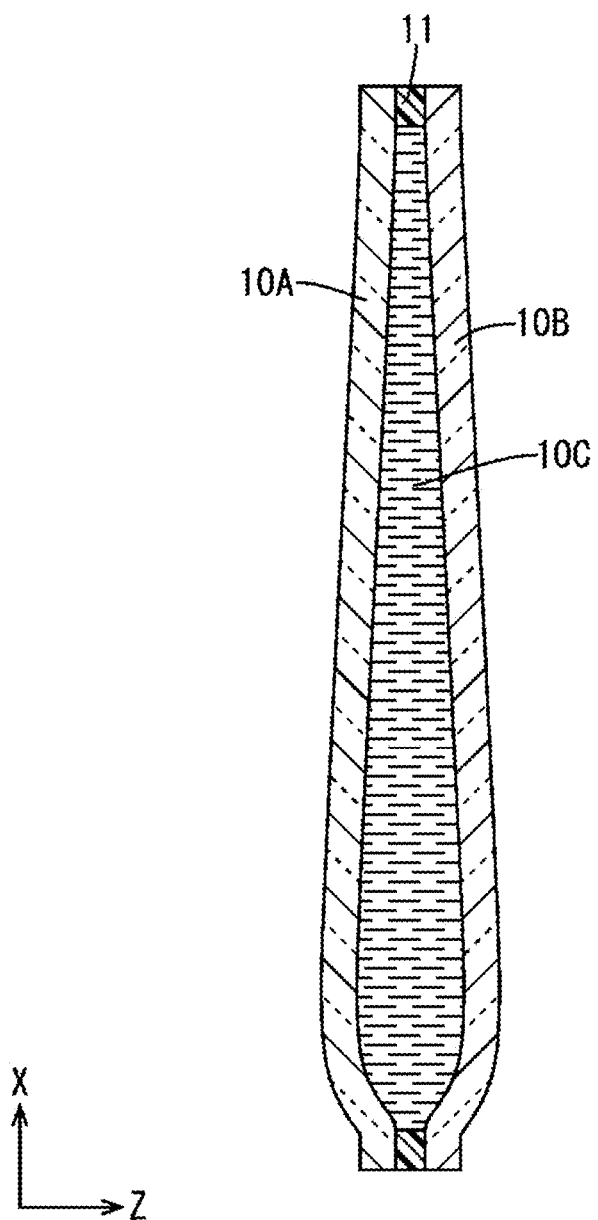
FIG. 3 is a schematic sectional view of the liquid crystal panel in which a liquid crystal pool is generated.

When the liquid crystal panel 10 having the above-described configuration is left for a predetermined time in a state of being stood so that, for example, the long-side direction (X-axis direction) is along a vertical direction, there is a possibility that the liquid crystal material is gathered in a lower end side of the liquid crystal panel 10 due to gravity as illustrated in FIG. 3. When the liquid crystal material is gathered in the lower end side of the liquid crystal panel 10, the thickness of the liquid crystal layer 10C locally becomes thick in the lower end side, so that there is a possibility that a display defect (gravity-originated unevenness) in which gray scale display becomes different from intended one is caused. Note that, FIG. 3 is a sectional view illustrating a state where the liquid crystal material is gathered in the lower end side of the liquid crystal panel 10. A possibility of causing a problem of such a liquid crystal pool becomes high when a filling amount of the liquid crystal material constituting the liquid crystal layer 10C becomes excessive and the distance between the pair of substrates 10A and 10B becomes too long compared with a protruding height of the spacer 12. On the contrary, when the filling amount of the liquid crystal material is insufficient and the distance between the pair of substrates 10A and 10B becomes too short compared with the protruding height of the spacer 12, there is a possibility that a bubble (low temperature bubble, vacuum babble) is generated due to thermal shrinkage of the liquid crystal material in a low temperature environment. Also in a case where such a bubble is generated, there is a possibility that the bubble is visually recognized by a user as a display defect (bubble-originated unevenness). As above, there is a proper range of the filling amount of the liquid crystal material, in which neither the problem of the liquid crystal pool (gravity-originated unevenness) nor the problem of the bubble (bubble-originated unevenness) is caused, and there is a tendency that, as the proper range is wider, variation which is related to the filling amount of the liquid crystal material and results from a manufacturing condition or the like is able to be allowed more and the wider proper range is desirable for achieving improvement of a non-defective rate and the like.

Figure 7:
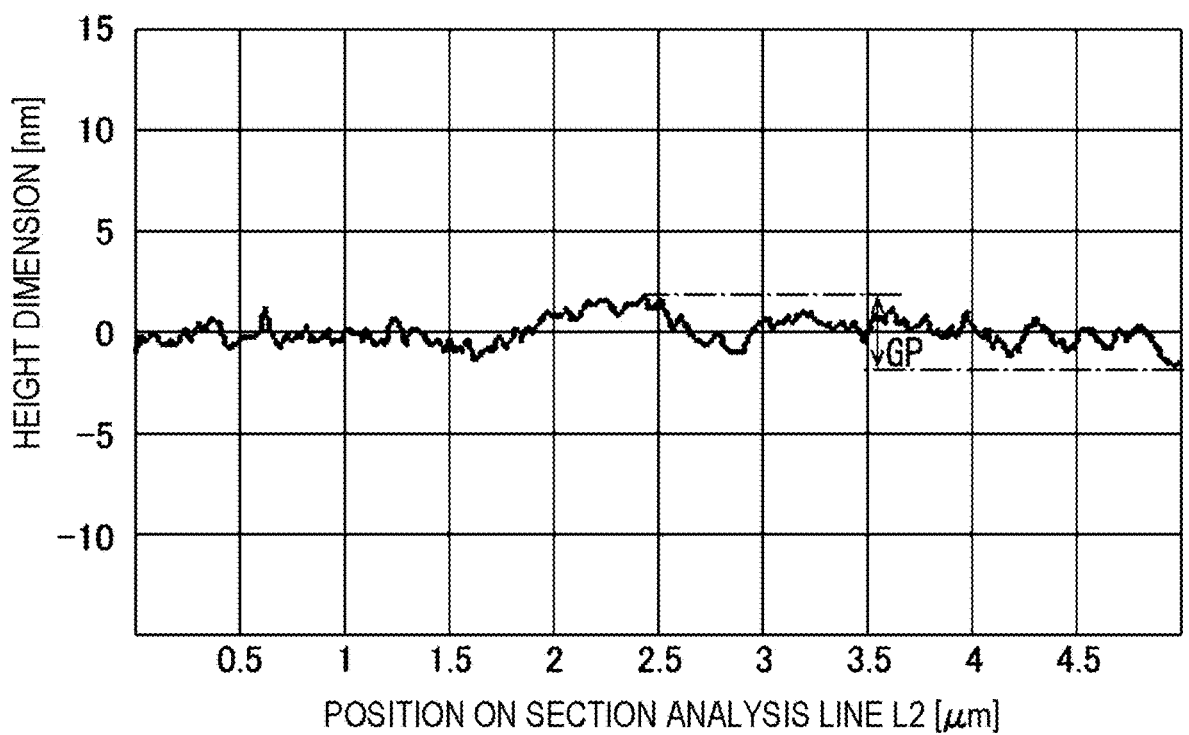
FIG. 7 is a view illustrating, as to the example of the comparative experiment 1, a sectional profile on a section analysis line L2 indicated in FIG. 5.

Then, the overcoat film 19 provided in the CF substrate 10A that constitutes the liquid crystal panel 10 according to the present embodiment is configured so that a gap GP between a lowest position and a highest position of fine irregularities which are generated in a reference range in a surface is 4 nm or less (refer to FIG. 7). In the present embodiment, the aforementioned reference range may be set as a square each side of which is 5 μm, but is not necessarily limited thereto. The surface of the overcoat film 19 is not formed as a perfect smooth surface in which no fine irregularity exists, so that it is inevitable that the fine irregularities are generated. The fine irregularities generated on the surface of the overcoat film 19 have a great influence on a surface area related to an interface of the CF substrate 10A with the liquid crystal layer 10C. Here, when it is assumed that the gap GP between the lowest position and the highest position of the fine irregularities generated in the reference range of the surface of the overcoat film 19 exceeds 4 nm, the surface area related to the interface of the CF substrate 10A with the liquid crystal layer 10C becomes too large, so that interfacial tension generated in the interface of the CF substrate 10A with the liquid crystal layer 10C is caused to be reduced, resulting in that the problem of the liquid crystal pool is easily caused. On the other hand, when it is set that the gap GP between the lowest position and the highest position of the fine irregularities generated in the reference range of the surface of the overcoat film 19 is 4 nm or less, the surface area related to the interface of the CF substrate 10A with the liquid crystal layer 10C is kept sufficiently small, so that the interfacial tension generated in the interface of the CF substrate 10A with the liquid crystal layer 10C is sufficiently secured. Accordingly, even in a case where the liquid crystal panel 10 is stood, the liquid crystal material included in the liquid crystal layer 10C is able to resist gravity with the sufficient interfacial tension, so that a situation where the liquid crystal material is gathered in the lower end side of the liquid crystal panel 10 is difficult to be caused. Since it is thereby possible to set the proper range related to the filling amount of the liquid crystal material to be wide, even when the filling amount of the liquid crystal material becomes larger than a scheduled amount to some extent due to a manufacturing condition or the like, the display defect resulting from the liquid crystal pool is not caused in many cases. Thus, the gap GP which is 4 nm or less is suitable for achieving improvement of the non-defective rate and the like.

The overcoat film 19 may be configured so that a surface area increase rate that is obtained by dividing an actually measured surface area, which is obtained by actually performing measurement in the reference range, by an assumed surface area, which is obtained by assuming that the reference range is a smooth surface in which no fine irregularity exists, and then subtracting 1 from the value obtained by the division is 0.071% or less (refer to FIG. 13). The assumed surface area is a theoretically minimum surface area in the reference range. On the contrary, on the actual surface of the overcoat film 19, the fine irregularities are generated, so that the actually measured surface area is larger than the assumed surface area by an amount of the irregularities. Moreover, there is a tendency that, as the aforementioned gap GP related to the irregularities becomes greater, a difference between the actually measured surface area and the assumed surface area becomes larger and the surface area increase rate that is obtained by dividing the actually measured surface area by the assumed surface area and then subtracting 1 from the value obtained by the division becomes greater. Here, when it is assumed that the surface area increase rate exceeds 0.071%, the gap GP related to the fine irregularities generated on the surface of the overcoat film 19 becomes too great and the surface area in the reference range becomes too large, so that the interfacial tension generated in the interface of the CF substrate 10A with the liquid crystal layer 10C is reduced, resulting in that the problem of the liquid crystal pool is easily caused. On the other hand, when the surface area increase rate is set to be 0.071% or less, the gap GP related to the fine irregularities generated on the surface of the overcoat film 19 is set to be sufficiently small and the surface area in the reference range is set to be sufficiently small, so that the interfacial tension generated in the interface of the CF substrate 10A with the liquid crystal layer 10C is sufficiently secured. Thereby, the problem of the liquid crystal pool is difficult to be caused, so that the surface area increase rate that is 0.071% or less is suitable for achieving improvement of the non-defective rate and the like.

In addition, the overcoat film 19 may be formed of an ultraviolet-curable resin material. Specifically, the overcoat film 19 according to the present embodiment is formed of acrylic resin which is one of ultraviolet-curable resin materials. The acrylic resin is a radical polymerization type one. When ultraviolet rays are radiated, the ultraviolet rays are absorbed by a photopolymerization initiator and a radical is thereby generated, and, in accordance thereto, a monomer and an oligomer that have an acryloyl group are radically polymerized, so that a curing reaction is promoted. Specifically, in the present embodiment, curing of the overcoat film 19 is achieved when ultraviolet rays having a wavelength of 365 nm are radiated so that a total dose is about 100 mJ/cm$^2$ to 200 mJ/cm$^2$. Here, when it is assumed that the overcoat film 19 is formed of epoxy resin that is one of thermosetting resin materials, a contained thermosetting agent occupies a great volume, so that a local convex portion is easily formed on the surface. Such a local convex portion may cause the gap GP to exceed 4 nm. However, since the overcoat film 19 according to the present embodiment is formed of the ultraviolet-curable resin material, formation of the local convex portion as above is suppressed. Thereby, certainty that the gap GP related to the fine irregularities generated on the surface of the overcoat film 19 is 4 nm or less is increased. Accordingly, the problem of the liquid crystal pool is difficult to be caused, so that the overcoat film 19 formed of the ultraviolet-curable resin material is suitable for achieving improvement of the non-defective rate and the like.

Moreover, as illustrated in FIG. 2, on an upper layer side of the overcoat film 19 having the above-described configuration and the spacers 12, not an alignment film subjected to rubbing treatment but the CF-side optical alignment film 21 subjected to optical alignment treatment is arranged. Compared with a case where the alignment film subjected to rubbing treatment is used, in the CF-side optical alignment film 21, roughness is difficult to be generated on a surface and adhesion of a rubbing chip or the like to the surface is suppressed. Accordingly, compared with the case where the alignment film subjected to rubbing treatment is used, the CF-side optical alignment film 21 is easily influenced by a state of the surface of the overcoat film 19 serving as a base, so that irregularities similar to the fine irregularities generated on the surface of the overcoat film 19 are easily generated on the surface of the CF-side optical alignment film 21. Since the overcoat film 19 serving as the base of the CF-side optical alignment film 21 as above is configured so that the gap GP between the lowest position and the highest position of the fine irregularities generated in the reference range on the surface is 4 nm or less, a gap GP related to the fine irregularities generated on the surface of the CF-side optical alignment film 21 is also sufficiently small. Thereby, the problem of the liquid crystal pool is difficult to be caused, so that the CF-side optical alignment film 21 subjected to optical alignment treatment is suitable for achieving improvement of the non-defective rate and the like.

Next, in order to verify superiority of the liquid crystal panel 10 according to the present embodiment, comparative experiments 1 and 2 described below were carried out. First, the comparative experiment 1 will be described. In the comparative experiment 1, a case of using a CF substrate in which an overcoat film is formed of epoxy resin that is one of thermosetting resin materials was set as a comparative example and a case of using a CF substrate in which the overcoat film 19 is formed of acrylic resin that is one of ultraviolet-curable resin materials was set as an example, and irregularities generated on a surfaces of each of the overcoat films provided in the comparative example and the example were measured. In the comparative example and the example, configurations were similar to that of the CF substrate 10A described before the present paragraph except for configurations of the overcoat films. In the comparative experiment 1, the fine irregularities existing on the surfaces of the overcoat films were measured with use of an atomic force microscope (AFM). The atomic force microscope is one of scanning probe microscopes (SPMs), and uses a method of three-dimensionally measuring shapes of nanoscale irregularities by scanning a surface of a sample with a fine probe and detecting force (atomic force) acting between atoms of the sample and the probe. A measuring target range by the atomic force microscope was a square, each side of which is 5 μm and which is a reference range, on each of the surfaces of the overcoat films of the comparative example and the example.

Figure 4:
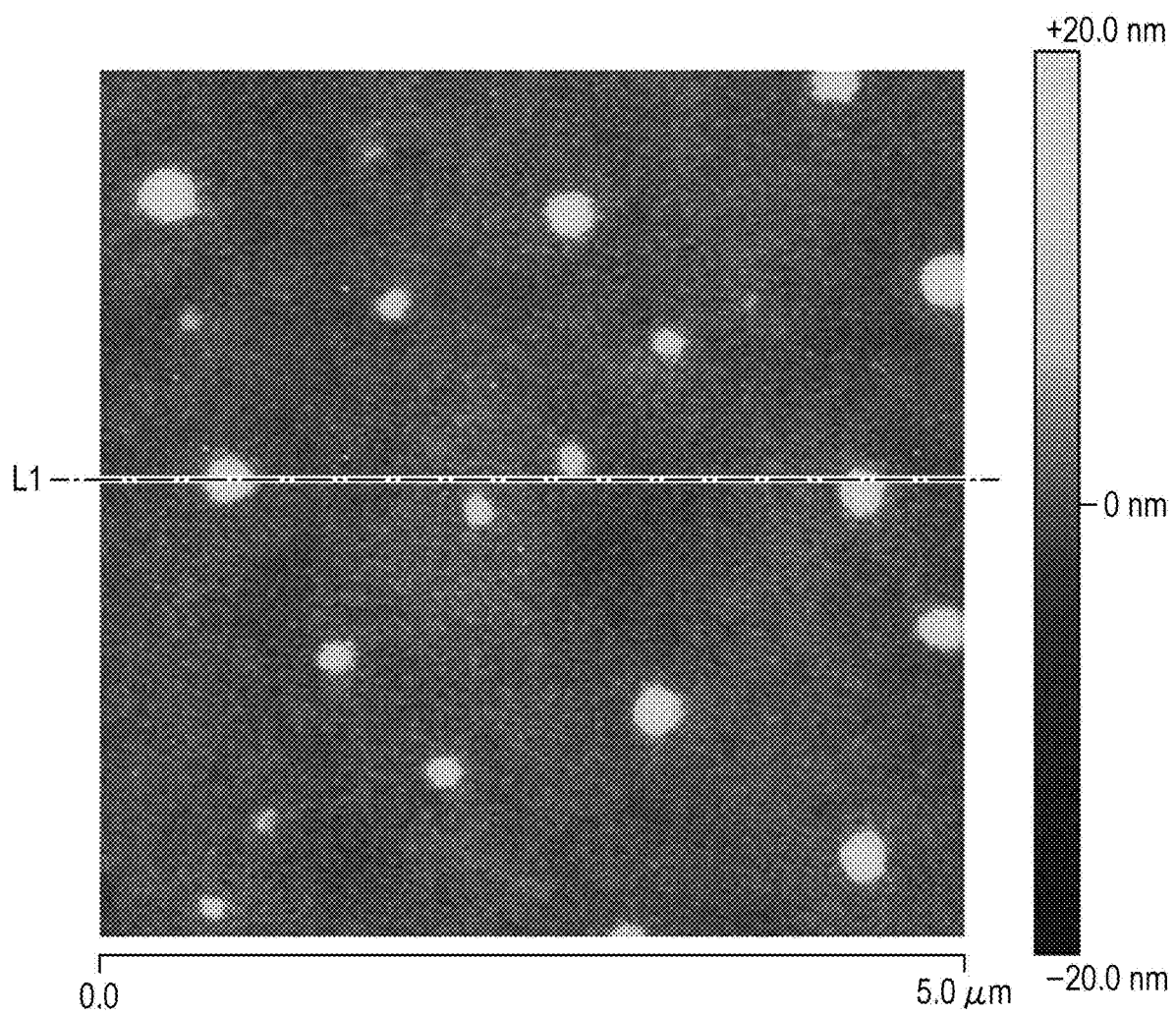
FIG. 4 is a view illustrating an AFM image of a comparative example of a comparative experiment 1.
Figure 5:
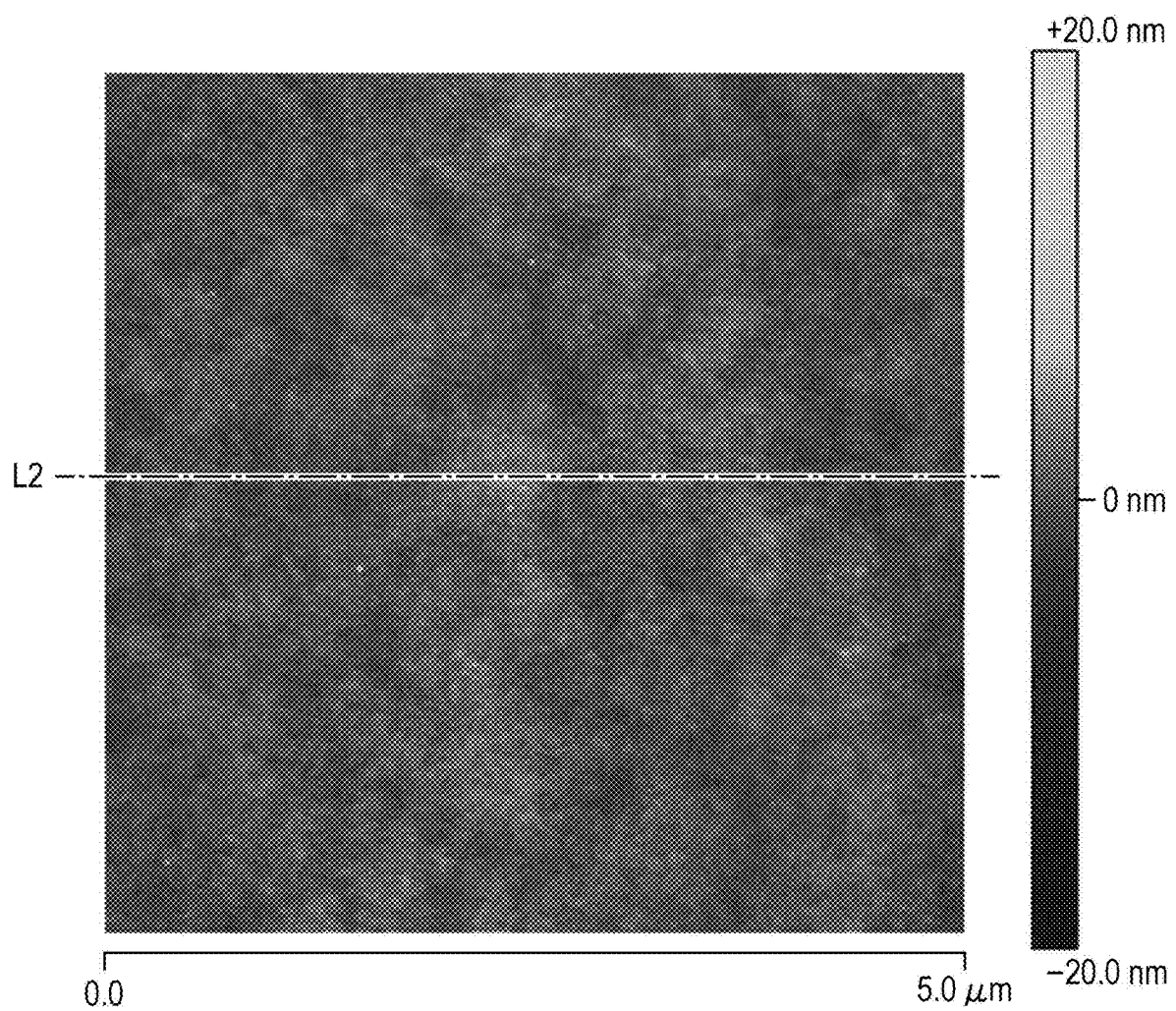
FIG. 5 is a view illustrating an AFM image of an example of the comparative experiment 1.
Figure 6:
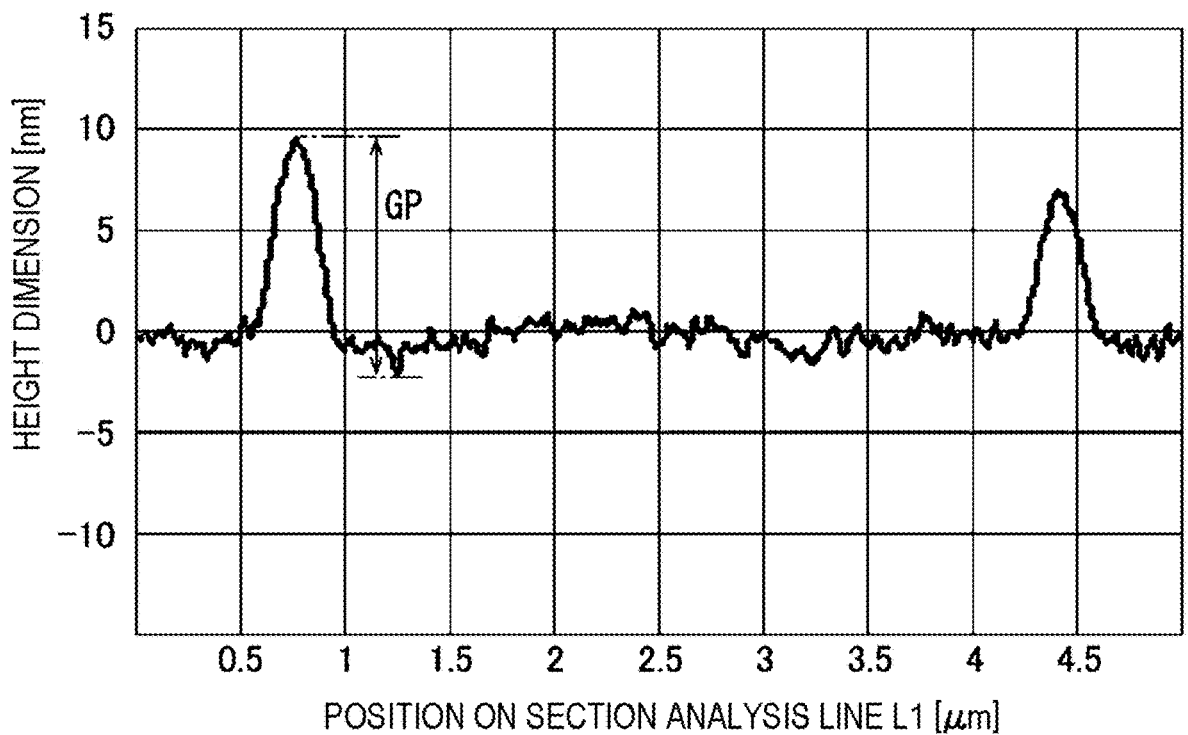
FIG. 6 is a view illustrating, as to the comparative example of the comparative experiment 1, a sectional profile on a section analysis line L1 indicated in FIG. 4.

Experiment results of the comparative experiment 1 are illustrated in FIGS. 4 to 13. FIGS. 4 and 5 are views each illustrating an AFM image of the reference range (square each side of which is 5 μm) on the surface of the overcoat film, in which irregularities based on data obtained by measurement of the atomic force microscope are expressed with a shade. FIG. 4 illustrates an experiment result of the comparative example and FIG. 5 illustrates an experiment result of the example. In each of FIGS. 4 and 5, a dimension is indicated with a left end position of the figure of the AFM image as reference. Moreover, in each of FIGS. 4 and 5, a sample of the shade related to the AFM image is illustrated with a height dimension of the irregularities, and the sample is illustrated so that a convex whose height from a reference position (0 nm) is +20 nm is lightest and a concave whose height from the reference position is −20 nm is darkest. FIG. 6 is a view illustrating a sectional profile on a section analysis line L1 indicated in FIG. 4. FIG. 7 is a view illustrating a sectional profile on a section analysis line L2 indicated in FIG. 5. A vertical axis illustrated in each of FIGS. 6 and 7 indicates the height dimension from the reference position (0 nm) along the Z-axis direction, a positive value and a negative value respectively indicate a "convex" and a "concave", and a unit is "nm". Horizontal axes illustrated in FIGS. 6 and 7 respectively indicate positions on the section analysis lines L1 and L2 with left end positions in FIGS. 4 and 5 as reference (0 μm), and a unit is "μm".

Figure 8:
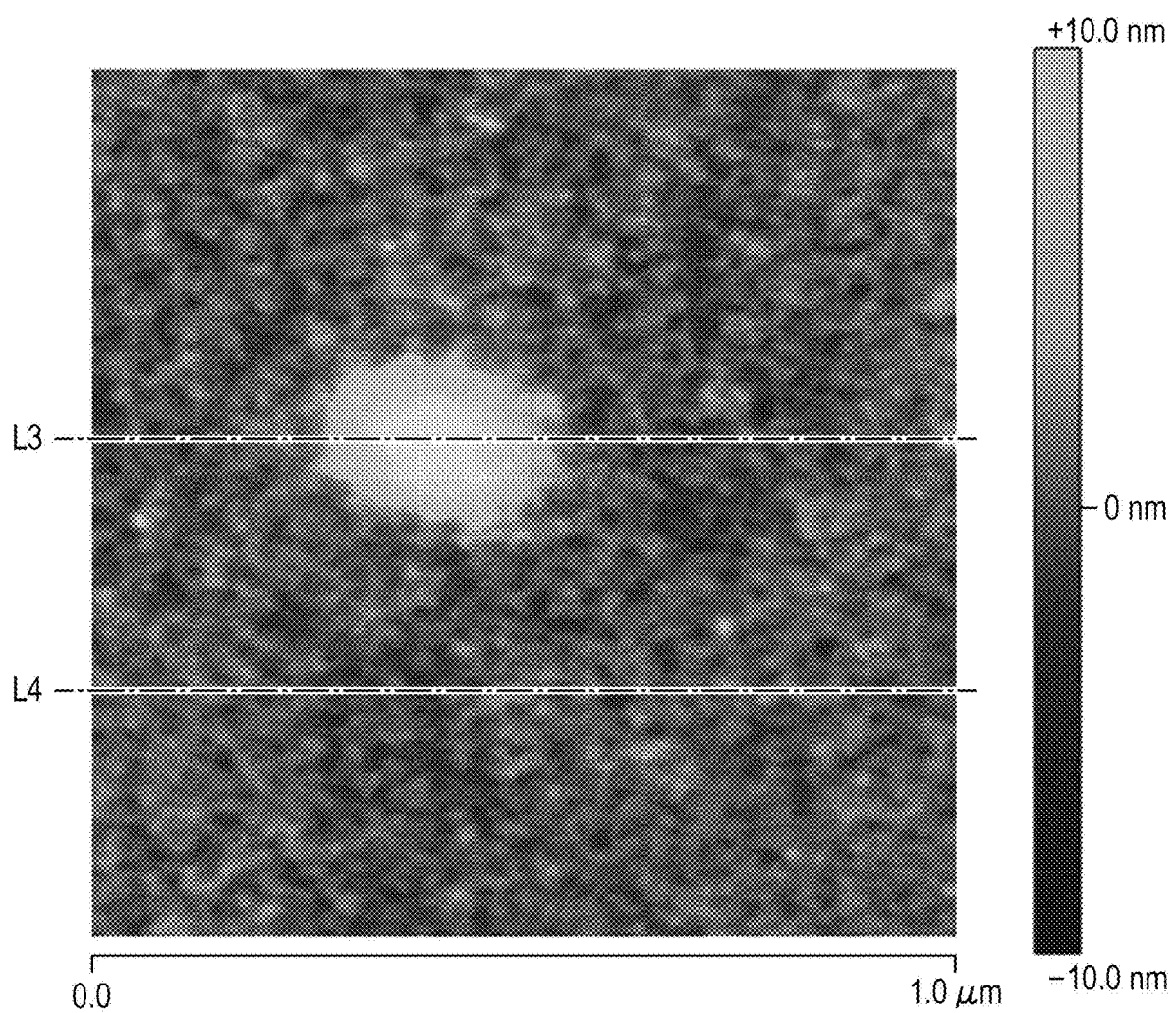
FIG. 8 is a view in which a part of the AFM image of the comparative example in the comparative experiment 1 is enlarged.
Figure 9:
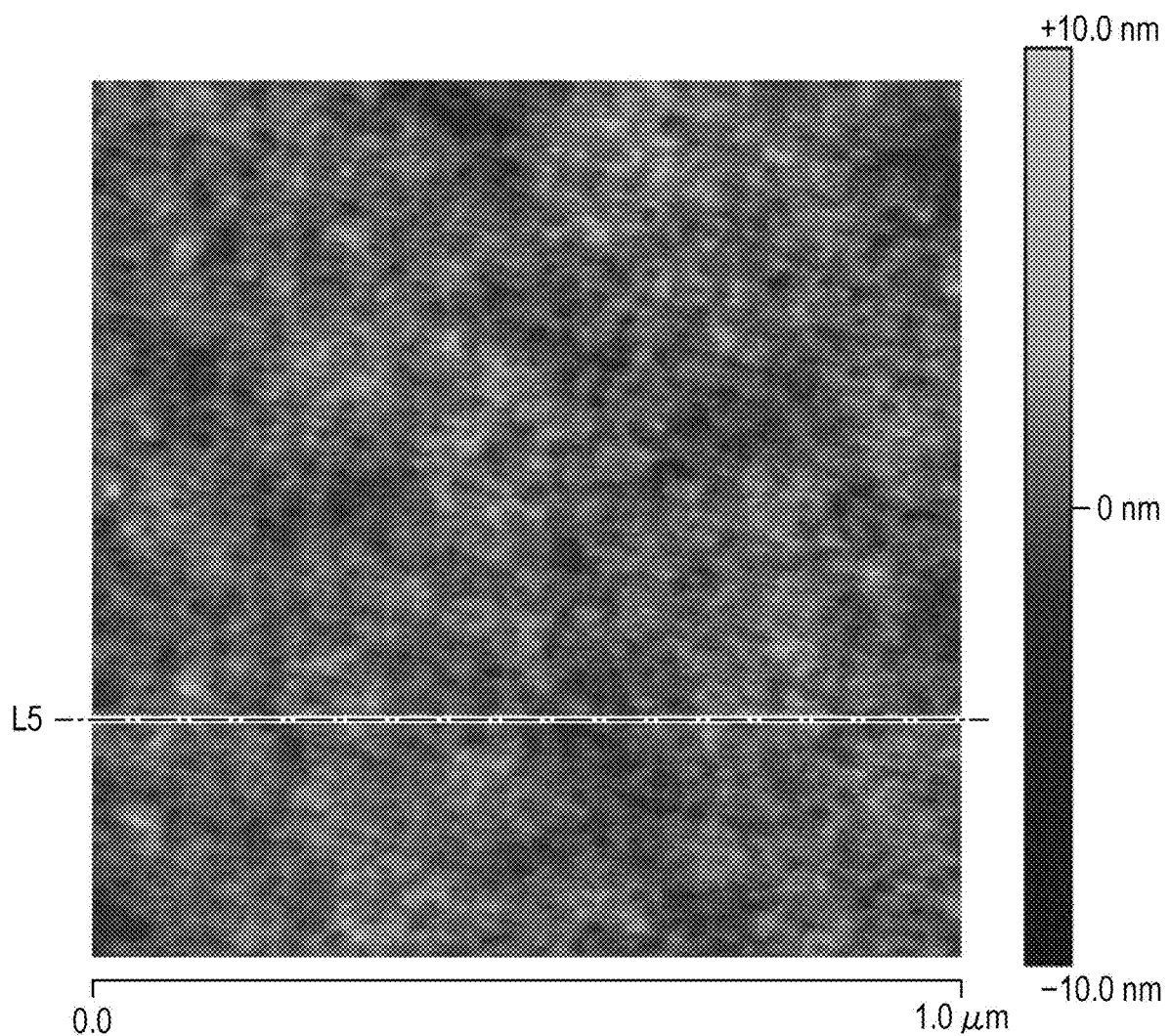
FIG. 9 is a view in which a part of the AFM image of the example in the comparative experiment 1 is enlarged.
Figure 10:
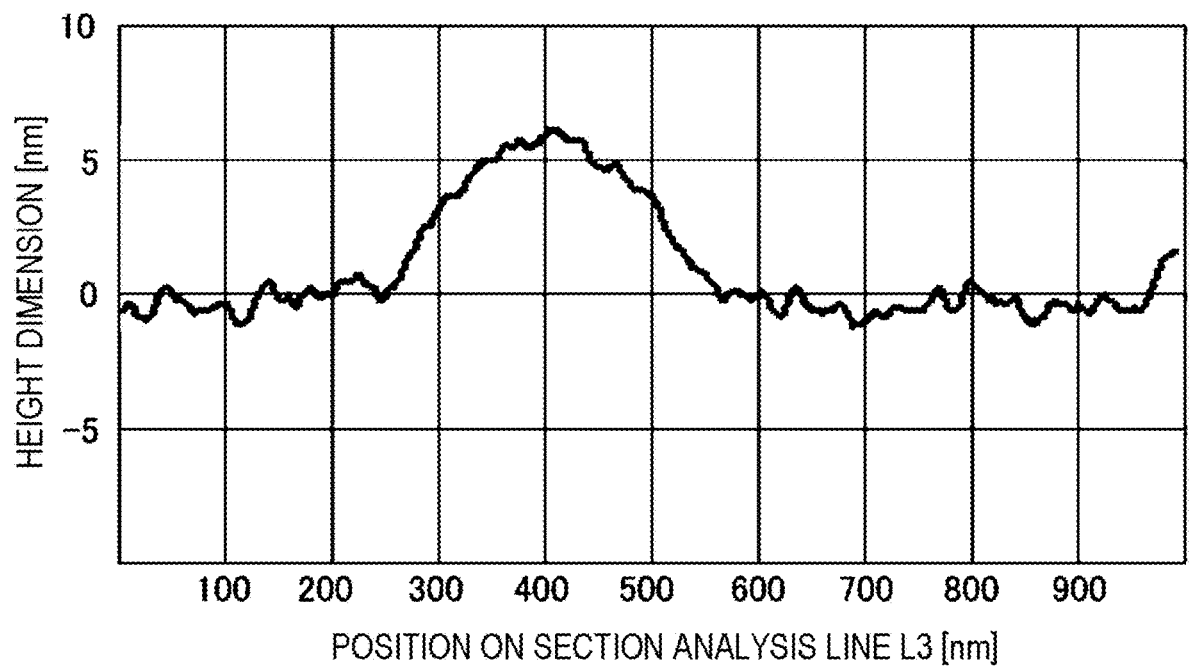
FIG. 10 is a view illustrating, as to the comparative example of the comparative experiment 1, a sectional profile on a section analysis line L3 indicated in FIG. 8.
Figure 11:
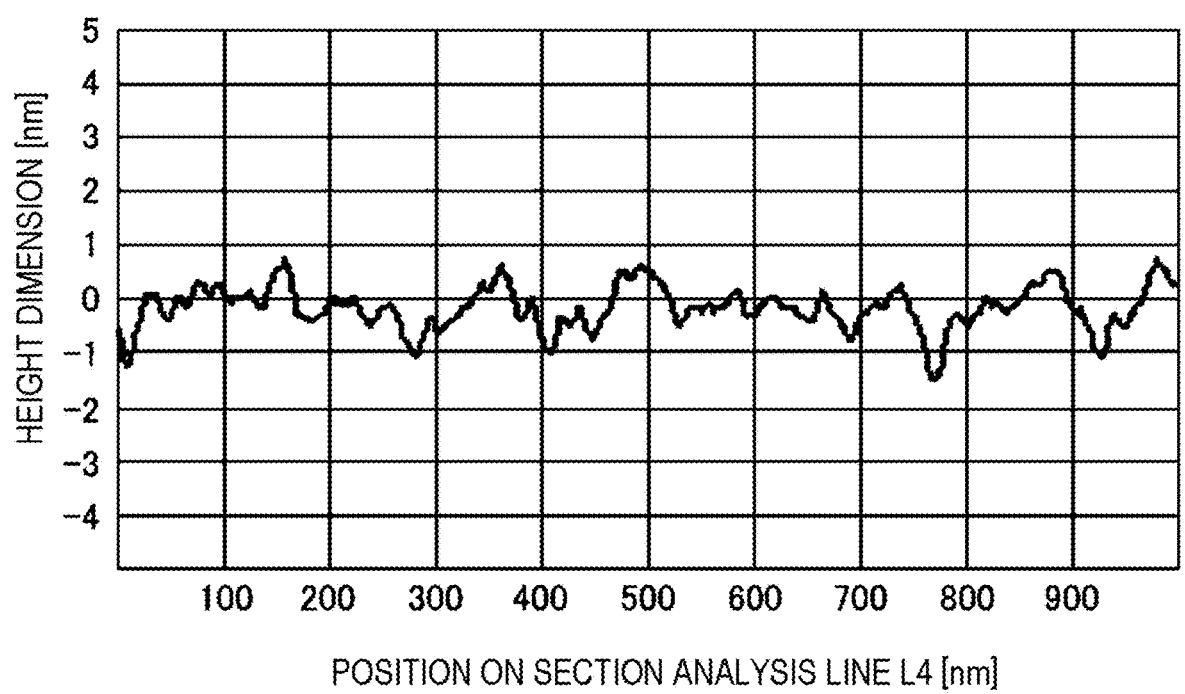
FIG. 11 is a view illustrating, as to the comparative example of the comparative experiment 1, a sectional profile on a section analysis line L4 indicated in FIG. 8.
Figure 12:
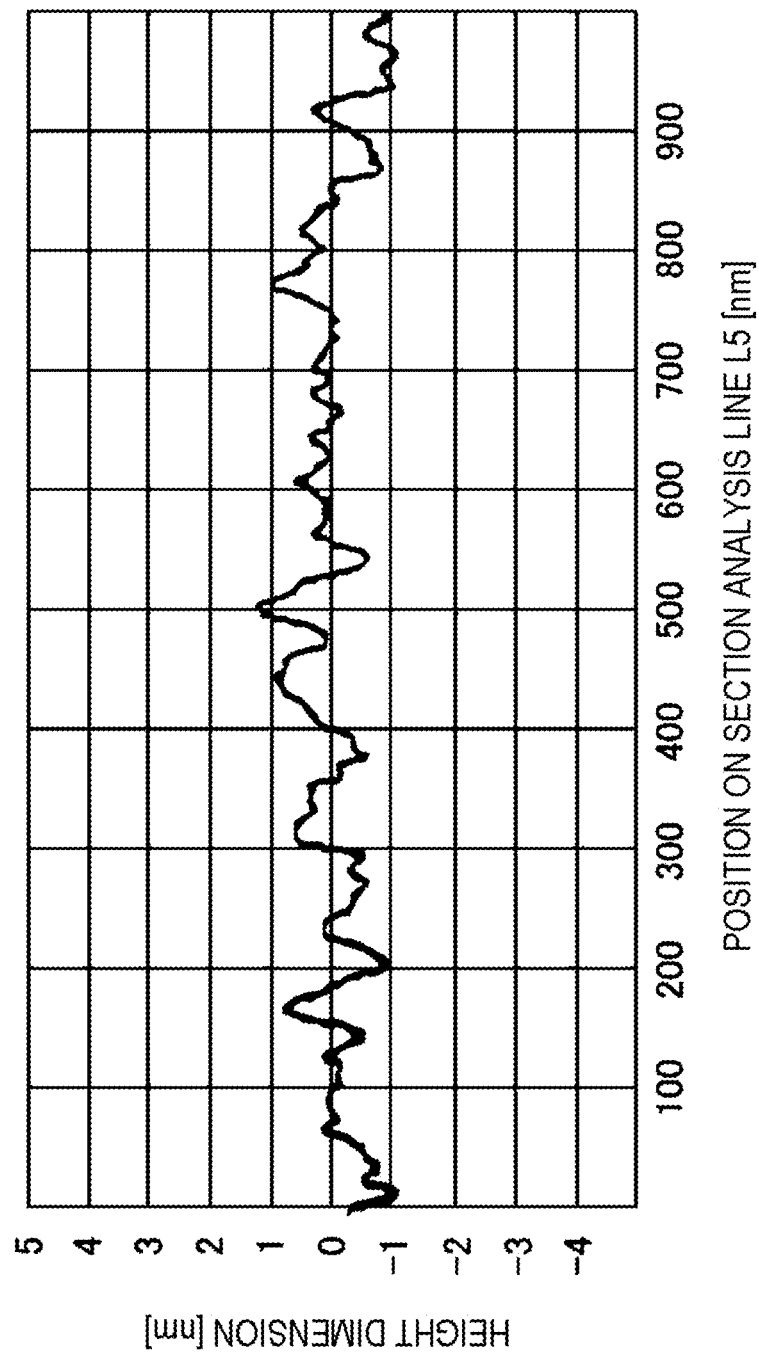
FIG. 12 is a view illustrating, as to the example of the comparative experiment 1, a sectional profile on a section analysis line L5 indicated in FIG. 9.

FIG. 8 is a view in which a part of the AFM image illustrated in FIG. 4 is enlarged. FIG. 9 is a view in which a part of the AFM image illustrated in FIG. 5 is enlarged. Specifically, ranges of squares, each side of which is 1 μm, of FIGS. 4 and 5 each illustrating the AFM image related to the reference range of the square each side of which is 5 μm are respectively enlarged in FIGS. 8 and 9. Moreover, similarly to FIGS. 4 and 5, in each of FIGS. 8 and 9, a dimension (0 μm to 1 μm) that is set with a left end position of the figure of the AFM image as reference, a sample of a shade related to the AFM image, and the height dimension (±10 nm) of the irregularities are illustrated. FIG. 10 is a view illustrating a sectional profile on a section analysis line L3 indicated in FIG. 8. FIG. 11 is a view illustrating a sectional profile on a section analysis line L4 indicated in FIG. 8. FIG. 12 is a view illustrating a sectional profile on a section analysis line L5 indicated in FIG. 9. Vertical axes and horizontal axes illustrated in FIGS. 10 to 12 are respectively similar to the vertical axes and the horizontal axes which are illustrated in FIGS. 6 and 7 (however, except that a unit of each of the horizontal axes is "nm"). FIG. 13 is a table in which numerical values that are related to surface roughness and surface areas and obtained on the basis of data obtained by measurement of the atomic force microscope are summarized. In the table of FIG. 13, root-mean-square roughness Rq (a unit is "nm"), arithmetic mean roughness Ra (a unit is "nm"), an assumed surface area (a unit is "μm$^2$"), an actually measured surface area (a unit is "μm$^2$"), and a surface area increase rate (a unit is "%") are indicated for each of the comparative example and the example. Among them, the assumed surface area is a surface area when it is assumed that the reference range of the square each side of which is 5 μm is a smooth surface in which no fine irregularity exists, and is a theoretically minimum surface area in the reference range. The actually measured surface area is an actual surface area obtained by measuring the irregularities, which are generated on the surface of the overcoat film, by the atomic force microscope. The surface area increase rate is a percentage of a value obtained by dividing the actually measured surface area by the assumed surface area and then subtracting 1 from the value obtained by the division.

The experiment results of the comparative experiment 1 will be described. FIGS. 4 and 6 illustrate that a plurality of local convex portions height dimensions of which are about 6 nm to 10 nm randomly exist in the reference range of the comparative example, in which fine irregularities repeatedly exist over an entire area. With reference to FIG. 6, a gap GP between a highest position and a lowest position of the irregularities generated in the reference range of the comparative example is about 11 nm. On the other hand, FIGS. 5 and 7 illustrate that, in the reference range of the example, fine irregularities repeatedly exist over an entire area, but no local convex portion exists. With reference to FIG. 7, a gap GP between a highest position and a lowest position of the irregularities generated in the reference range of the example is small compared with that of the comparative example, and is 4 nm or less. More specifically, FIGS. 8, 10, and 11 illustrate that, except for the local convex portions, the fine irregularities repeatedly exist in the comparative example similarly to the example illustrated in FIGS. 9 and 12. It is inferred that a reason why the local convex portions existence of which is confirmed only in the comparative example are generated is that a thermosetting agent contained in the epoxy resin that is the thermosetting resin material occupies a great volume compared with other components and a projection is therefore generated with the thermosetting agent as a center. On the other hand, it is inferred that, in the example, since the overcoat film is formed with use of the acrylic resin that is the ultraviolet-curable resin material and does not include a thermosetting agent such as the one contained in the epoxy resin, a state of the surface, in which no local convex portion exists, is provided.

With reference to FIG. 13, both of the numerical values of the root-mean-square roughness Rq and the arithmetic mean roughness Ra of the example are smaller than those of the comparative example. This means that the surface of the overcoat film of the example is not rougher than that of the comparative example. The actually measured surface area of the example is 25.01775 μm$^2$ and smaller than the actually measured surface area of the comparative example, which is 25.02625 μm$^2$. In accordance thereto, the surface area increase rate of the example is 0.071% and smaller than the surface area increase rate of the comparative example, which is 0.105%. It is inferred that a reason of such a result is that, as is clear from numerical values of the gaps GP, which are explained in the previous paragraph and obtained on the basis of FIGS. 6 and 7, in addition to the respective numerical values of the root-mean-square roughness Rq and the arithmetic mean roughness Ra, an increase in the surface area, which results from the irregularities generated on the surface, is suppressed more in the example than in the comparative example. As above, the surface area of the overcoat film of the example is smaller than that of the comparative example. Note that, in the comparative experiment 1, an experiment in which the surfaces of the overcoat films of the comparative example and the example were observed by using a scanning electron microscope (SEM) whose resolution is lower than that of the atomic force microscope was supplementarily carried out, and there is hardly any difference in experiment results between the comparative example and the example. That is, it can be said that a difference in states of the surfaces between the comparative example and the example is not able to be detected until the atomic force microscope whose resolution is high is used.

Figure 14:
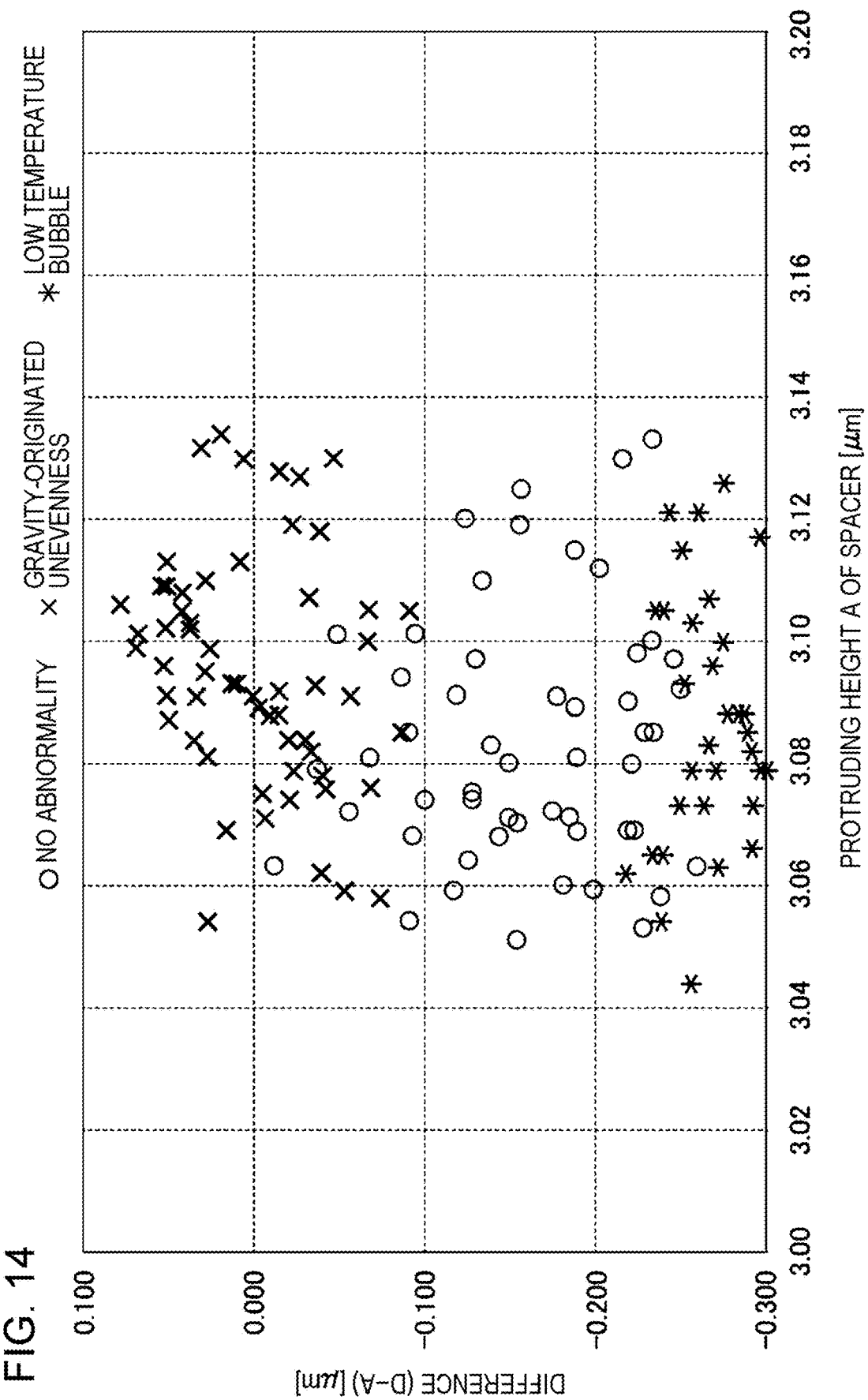
FIG. 14 is a view illustrating a relationship between a protruding height of a spacer and a difference, which is obtained by subtracting the protruding height of the spacer from a distance between a pair of substrates, of a comparative example in a comparative experiment 2.
Figure 15:
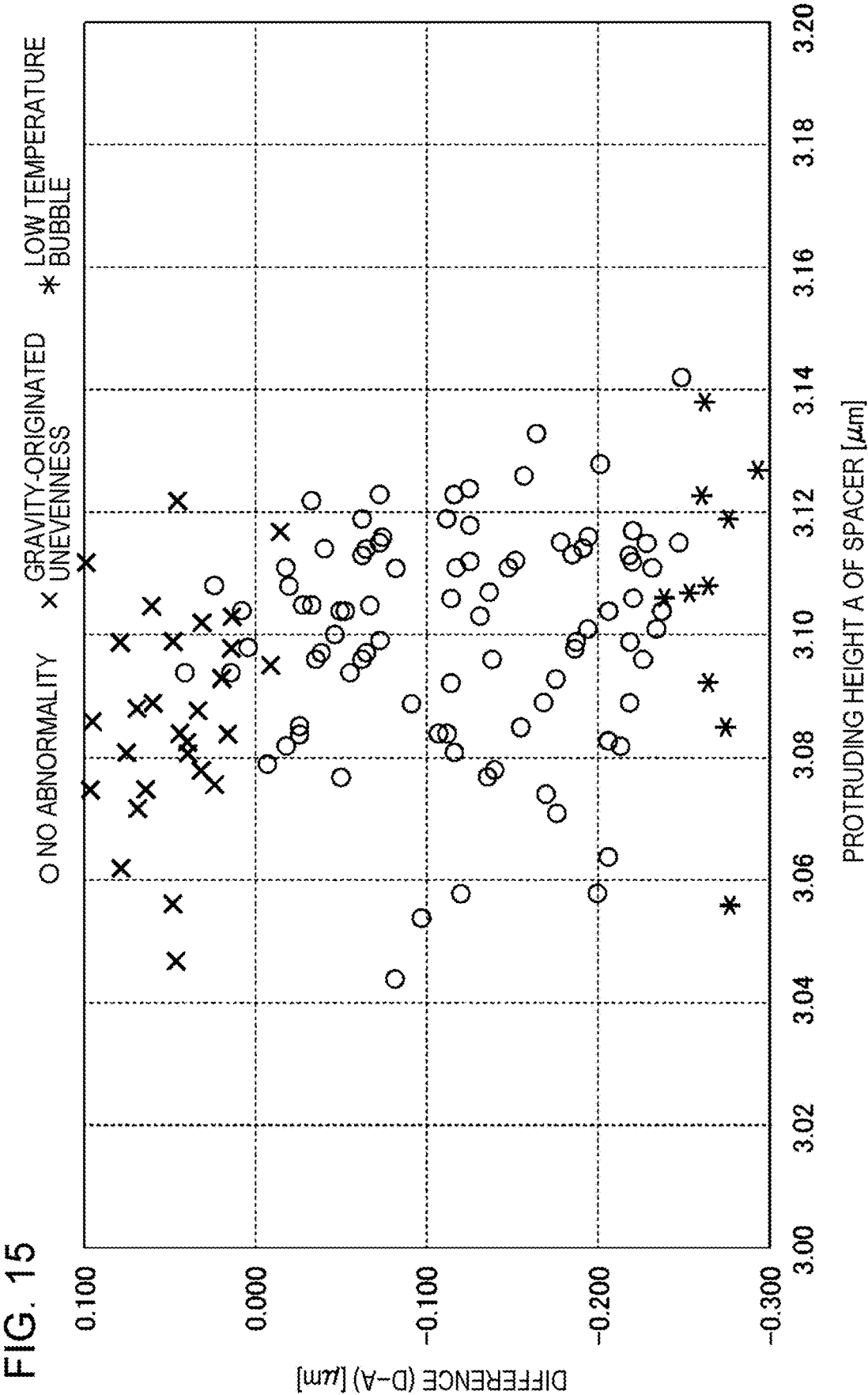
FIG. 15 is a view illustrating a relationship between a protruding height of a spacer and a difference, which is obtained by subtracting the protruding height of the spacer from a distance between a pair of substrates, of an example in the comparative experiment 2.

Next, the comparative experiment 2 will be described. In the comparative experiment 2, a plurality of liquid crystal panels each of which has a different distance (thickness of a liquid crystal layer) D between a pair of substrates that constitute the liquid crystal panel and a plurality of liquid crystal panel each of which has a different protruding height (height) A of a spacer were created, and whether or not a defect was caused was examined in the liquid crystal panels. The distance D between the pair of substrates depends on a filling amount of a liquid crystal material that constitutes the liquid crystal layer. In the comparative experiment 2, a case of using a liquid crystal panel that includes the CF substrate according to the comparative example having the configuration described in the comparative experiment 1 was set as a comparative example and a case of using a liquid crystal panel that includes the CF substrate according to the example described in the comparative experiment 1 was set as an example, and the aforementioned examination is performed for the comparative example and the example. The examination of the liquid crystal panels in the comparative experiment 2 includes high temperature examination and low temperature examination that will be described below. In the high temperature examination, the liquid crystal panels were left for 12 hours in a state of being stood in an environment where temperature was 85° C., and thereafter an examiner visually observed the liquid crystal panels through a polarizing plate for the examination and judged whether or not there was gravity-originated unevenness. In the low temperature examination, the liquid crystal panels were left for 12 hours in a state of being stood in an environment where temperature was −40° C., and thereafter the examiner visually observed the liquid crystal panels through a polarizing plate for the examination and judged whether or not there was a low temperature bubble. Experiment results related to the comparative experiment 2 are illustrated in FIGS. 14 and 15. In each of FIGS. 14 and 15, a horizontal axis indicates the protruding height A of the spacer (a unit is "μm") and a vertical axis indicates a difference (D−A) obtained by subtracting the protruding height A of the spacer from the distance D between the pair of substrates (a unit is "μm"). In FIGS. 14 and 15, a mark of "○" indicates an examination result of judging that there is no gravity-originated unevenness and no low temperature bubble (no abnormality), a mark of "×" indicates an examination result of judging that there is gravity-originated unevenness, and a mark of "*" indicates an examination result of judging that there is a low temperature bubble. FIG. 14 is a graph related to the comparative example and FIG. 15 is a graph related to the example.

The experiment results of the comparative experiment 2 will be described. FIGS. 14 and 15 illustrate that, in both the comparative example and the example, as long as a value of the difference (D−A) obtained by subtracting the protruding height A of the spacer from the distance D between the pair of substrates was in a certain numerical value range, it was judged that there was no unevenness and no bubble, regardless of the protruding height A of the spacer. Specifically, it is inferred that, when the value of the difference (D−A) exceeds a maximum value of the numerical value range, the filling amount of the liquid crystal material is excessive and the distance D between the pair of substrates is too long compared with the protruding height A of the spacer, so that the liquid crystal pool that the liquid crystal material is gathered in a lower end side of the liquid crystal panel due to gravity is generated in a high temperature environment, resulting in that a display defect is visually recognized and it is judged that there is gravity-originated unevenness. On the contrary, it is inferred that, when the value of the difference (D−A) falls below a minimum value of the numerical value range, the filling amount of the liquid crystal material is insufficient and the distance D between the pair of substrates is too short compared with the protruding height A of the spacer, so that the liquid crystal material thermally shrinks in a low temperature environment, resulting in that a display defect is visually recognized and it is judged that there is a low temperature bubble. When the experiment results of the comparative example, which are illustrated in FIG. 14, and the experiment results of the example, which are illustrated in FIG. 15, are compared, it is illustrated that, as to the value of the difference (D−A), the numerical value range in which neither gravity-originated unevenness nor a low temperature bubble is generated is relatively wide in the example compared with the comparative example. Specifically, while the numerical value range is from −0.21 to −0.1 and a difference between an upper limit value and a lower limit value is 0.11 in the comparative example, the numerical value range is from −0.21 to −0.02 and a difference between an upper limit value and a lower limit value is 0.19 in the example. When the example and the comparative example are compared as to the upper limit values and the lower limit values of the numerical value ranges, while the example and the comparative example have the same value of the lower limit value, the upper limit value of the example is greater than that of the comparative example. This means that, even when the value of the difference (D−A) is great, gravity-originated unevenness (liquid crystal pool) is difficult to be generated in the example compared with the comparative example.

Figure 16:
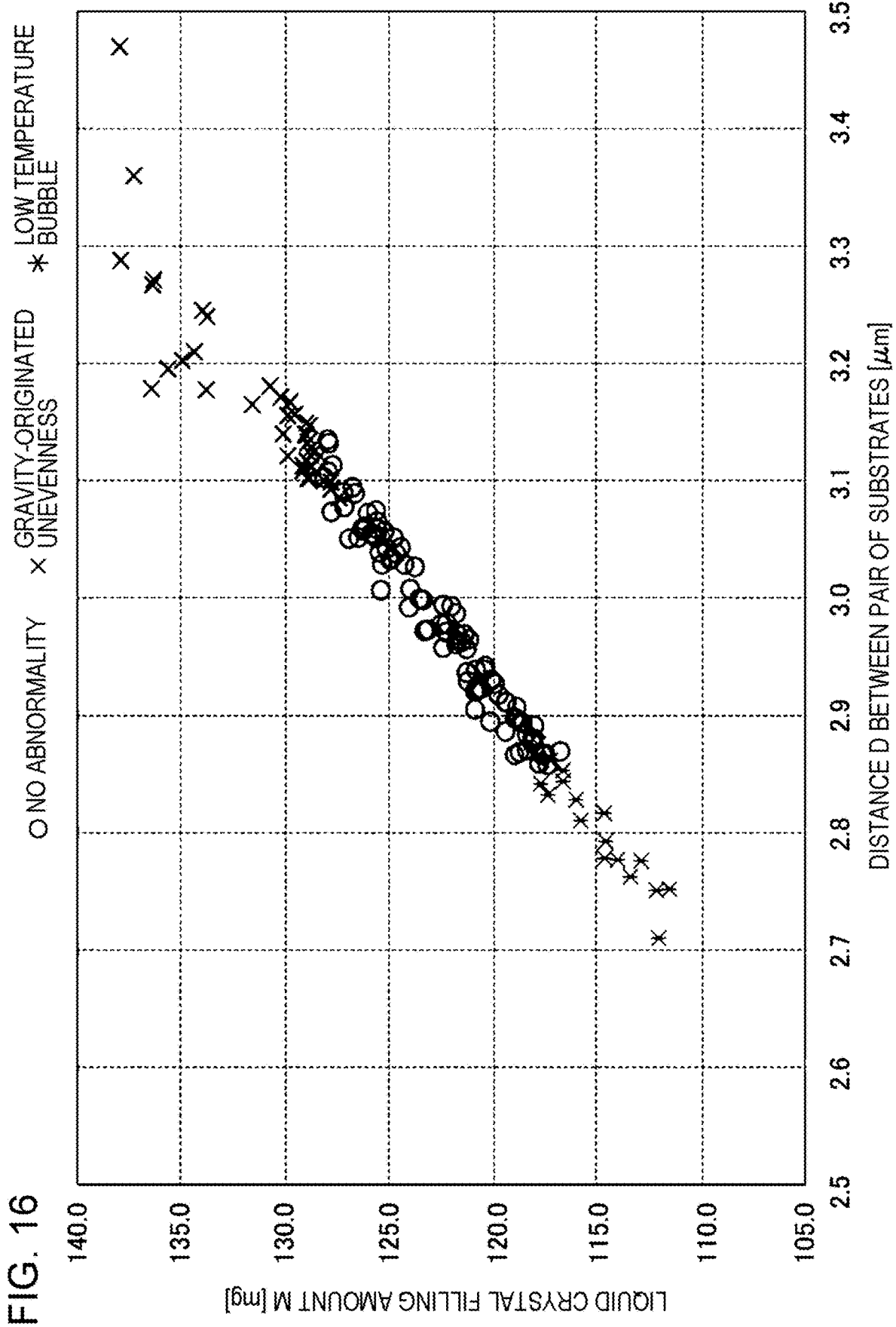
FIG. 16 is a view illustrating a relationship between the distance between the pair of substrates and a liquid crystal filling amount of the comparative example in the comparative experiment 2.
Figure 17:
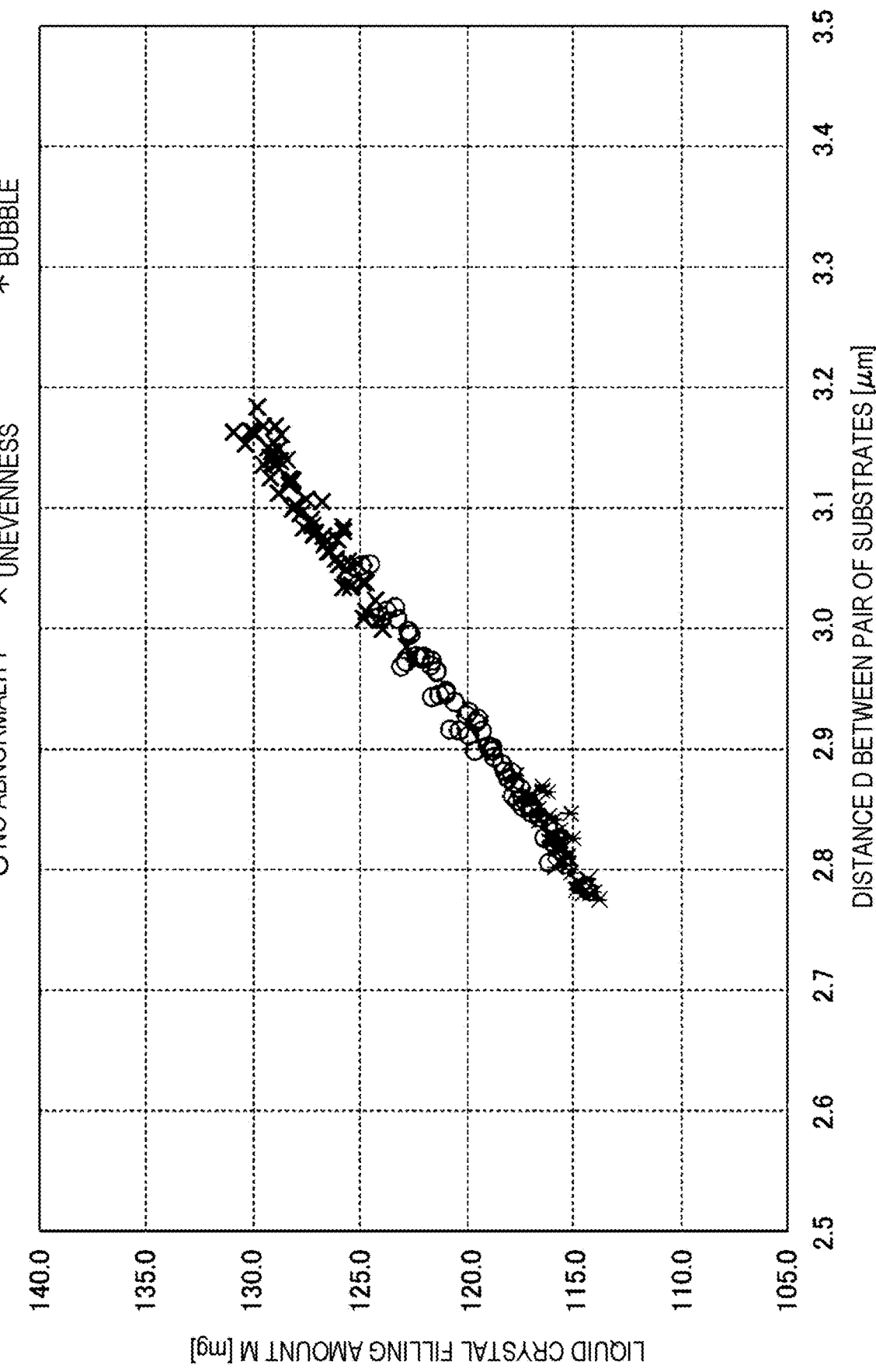
FIG. 17 is a view illustrating a relationship between the distance between the pair of substrates and a liquid crystal filling amount of the example in the comparative experiment 2.

As described in the explanation of the comparative experiment 2, the distance D between the pair of substrates depends on a liquid crystal filling amount M. FIGS. 16 and 17 respectively illustrate graphs that illustrate the experiment results of the comparative experiments 2, which are illustrated in FIGS. 14 and 15, on the basis of a relationship between the distance D between the pair of substrates and the liquid crystal filling amount M. In each of FIGS. 16 and 17, a horizontal axis indicates the distance D between the pair of substrates (a unit is "μm") and a vertical axis indicates the liquid crystal filling amount M (a unit is "mg"). In FIGS. 16 and 17, a mark of "0" indicates the examination result of judging that there is no gravity-originated unevenness and no low temperature bubble (no abnormality), a mark of "x" indicates the examination result of judging that there is gravity-originated unevenness, and a mark of "*" indicates the examination result of judging that there is a low temperature bubble. FIG. 16 is the graph related to the comparative example and FIG. 17 is the graph related to the example. FIGS. 16 and 17 illustrate that a numerical value range of a value of the liquid crystal filling amount M, in which neither gravity-originated unevenness nor a low temperature bubble is generated, that is, a proper range is relatively wide in the example compared with the comparative example. Particularly, in the example, it is illustrated that an upper limit value in the proper range of the liquid crystal filling amount M is a greater value than that of the comparative example and there is a tendency that gravity-originated unevenness is difficult to be generated even when the liquid crystal filling amount M is large. The tendency is similar to the experiment results illustrated in FIGS. 14 and 15.

Here, the liquid crystal pool that causes gravity-originated unevenness will be considered again. The liquid crystal pool is generated when the liquid crystal material that constitutes the liquid crystal layer 10C is gathered in the lower end side of the liquid crystal panel 10 due to gravity. Accordingly, it is possible to consider the liquid crystal pool to be a phenomenon that occurs when balance between gravity acting on the liquid crystal material and force against the gravity is upset. The force with which the liquid crystal material resists the gravity is interfacial tension T that is generated in an interface between the liquid crystal layer 10C and an inner surface of the CF substrate 10A. Accordingly, it is inferred that, as long as the liquid crystal filling amount M is within the proper range and the balance between the gravity acting on the liquid crystal material and the interfacial tension T against the gravity is kept, the liquid crystal pool is not generated, but, when the liquid crystal filling amount M becomes excessive and the gravity acting on the liquid crystal material exceeds the interfacial tension T against the gravity, the balance is upset and the liquid crystal pool is generated. The balance between the gravity and the interfacial tension T is made into a mathematical expression as the following formula (1). In the formula (1), "T" means the interfacial tension generated in the interface between the liquid crystal layer 10C and the inner surface of the CF substrate 10A, "m" means a weight of the liquid crystal material per unit length in a horizontal direction (short-side direction), "g" means gravitational acceleration, "D" means the distance between the pair of substrates 10A and 10B, and "H" means the outside dimension of the liquid crystal layer 10C in the vertical direction (long-side direction). A left side of the formula (1) means the interfacial tension T per unit length in a thickness direction of the liquid crystal layer 10C, and a right side of the formula (1) means gravity per unit length in the vertical direction, which acts on the liquid crystal material. The following formula (2) is obtained by modifying the formula (1). In the formula (2), "M" means the weight of the liquid crystal material, that is, the liquid crystal filling amount, and "W" means the outside dimension of the liquid crystal layer 10C in the horizontal direction. Note that, a relationship of "m=M/W" is provided.

$$T/(D/2) = m \cdot g \cdot (H/2) \quad (1)$$

$$T = D \cdot M \cdot g \cdot (H/2)/2 \cdot W \quad (2)$$

Figure 18:
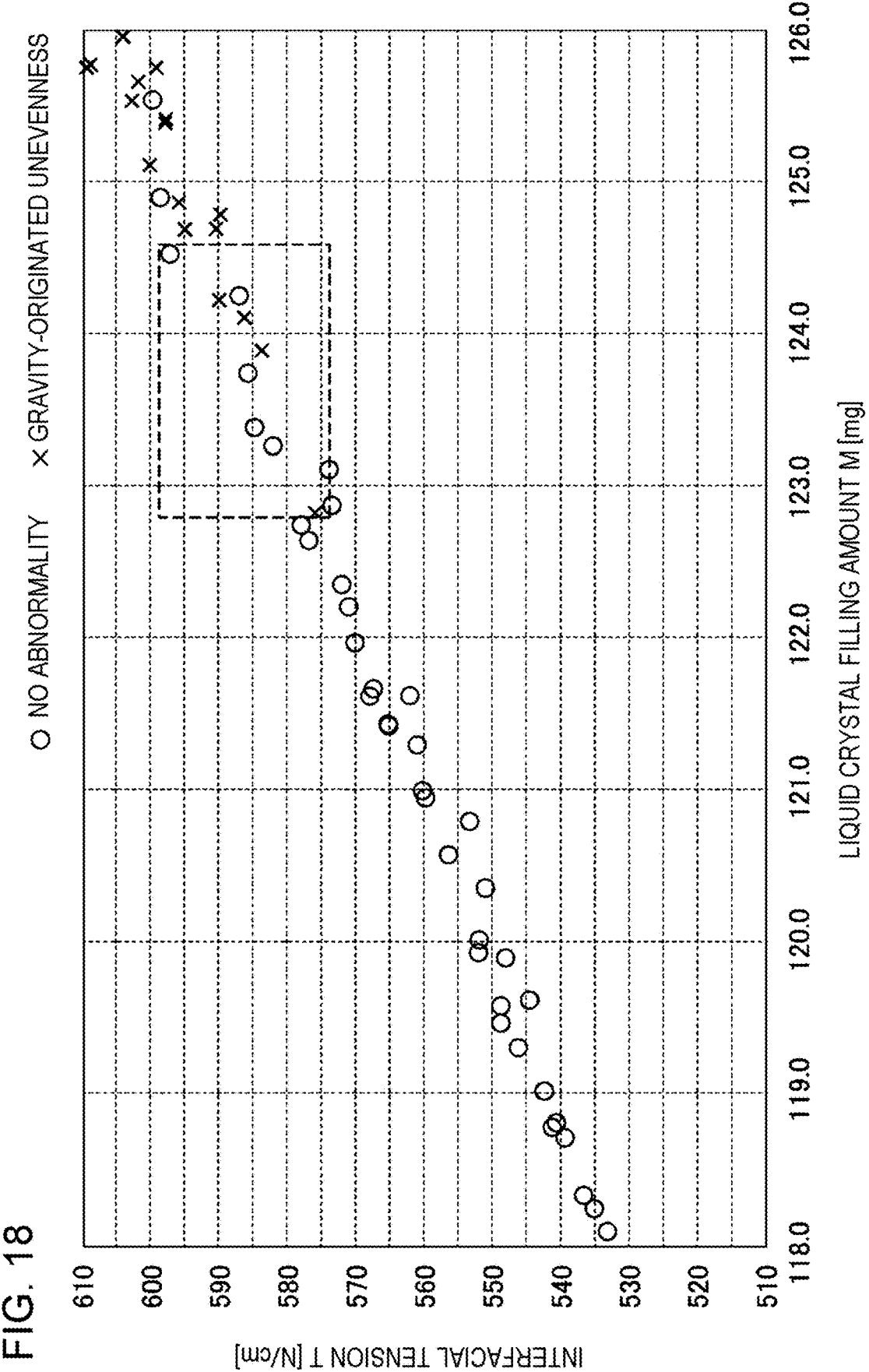
FIG. 18 is a view illustrating a relationship between the liquid crystal filling amount and interfacial tension of the comparative example in the comparative experiment 2.
Figure 19:
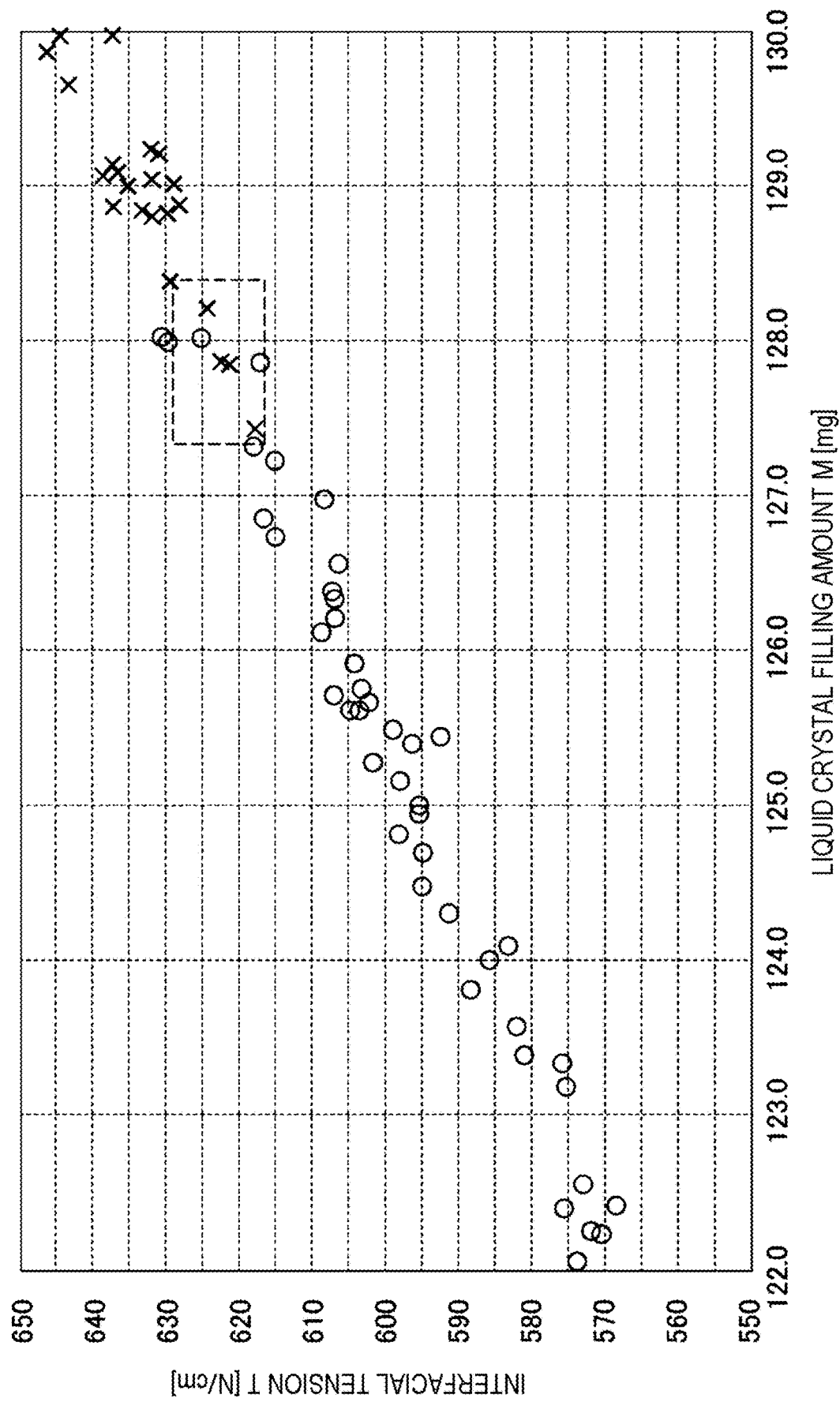
FIG. 19 is a view illustrating a relationship between the liquid crystal filling amount and interfacial tension of the example in the comparative experiment 2.

When values of "D", "M", "g", "H", and "W" are substituted in the formula (2), it is possible to calculate the interfacial tension T required for maintaining the balance. Then, by substituting numerical values according to the experiment results of the comparative experiment 2 in the formula (2), the interfacial tension T required for maintaining the balance is calculated. Specifically, as to each of plots illustrated in FIGS. 16 and 17, the distance D between the pair of substrates, which is indicated by the horizontal axis, and the liquid crystal filling amount M, which is indicated by the vertical axis, are respectively substituted for "D" and "M" that are included in a right side of the formula (2). For "g", "H", and "W" that are included in the right side of the formula (2), "980 cm/sect", "166.71 mm", and "260.02 mm" are respectively substituted as constants. FIGS. 18 and 19 each illustrate a relationship between the interfacial tension T, which is obtained in this manner and required for maintaining the balance, and the liquid crystal filling amount M. In each of FIGS. 18 and 19, a horizontal axis indicates the liquid crystal filling amount M (a unit is "mg") and a vertical axis indicates the interfacial tension T required for maintaining the balance (a unit is N/cm). In FIGS. 18 and 19, a mark of "○" indicates the examination result of judging that there is no gravity-originated unevenness and no low temperature bubble (no abnormality), and a mark of "×" indicates the examination result of judging that there is gravity-originated unevenness. In each of FIGS. 18 and 19, a limit range of the liquid crystal filling amount M is indicated as a range surrounded by a broken line. The "limit range of the liquid crystal filling amount M" is a numerical value range in which, when the liquid crystal filling amount M reaches the limit range, gravity-originated unevenness may be generated, and an individual difference of a product is reflected thereto. FIG. 18 is a graph according to the comparative example, and FIG. 19 is a graph according to the example.

FIGS. 18 and 19 illustrate that there is a tendency that, as the liquid crystal filling amount M increases, the interfacial tension T required for maintaining the balance also increases. It is inferred that, in the limit range of the liquid crystal filling amount M, which is surrounded by the broken line in each of FIGS. 18 and 19, there is a possibility that the interfacial tension T which is actually generated in a CF interface between the liquid crystal layer and the inner surface of the substrate does not reach the interfacial tension T required for resisting the gravity acting on the liquid crystal material, resulting in that there is an individual in which gravity-originated unevenness is generated. According to FIG. 18, in the comparative example, a lower limit value of the limit range of the liquid crystal filling amount M is about 122.8 mg. On the other hand, according to FIG. 19, in the example, a lower limit value of the limit range of the liquid crystal filling amount M is about 127.3 mg and is a value greater than that of the comparative example. Accordingly, it is possible to say that, even when the liquid crystal filling amount M becomes large, gravity-originated unevenness is less likely to be generated and an upper limit value of the proper range of the liquid crystal filling amount M is greater in the example compared with the comparative example. Moreover, it is also possible to say that, compared with the comparative example, the limit range of the liquid crystal filling amount M is narrow in the example, so that an individual difference of a product is small and stable quality is able to be obtained.

As to the limit range of the liquid crystal filling amount M in each of the comparative example illustrated in FIG. 18 and the example illustrated in FIG. 19, the interfacial tension T required for maintaining the balance has an upper limit value and a lower limit value. Specifically, the upper limit value of the interfacial tension T as to the limit range of the liquid crystal filling amount M in the comparative example illustrated in FIG. 18 is about 599 N/cm and the lower limit value is about 574 N/cm. On the other hand, the upper limit value of the interfacial tension T as to the limit range of the liquid crystal filling amount M in the example illustrated in FIG. 19 is about 628 N/cm and the lower limit value is about 617 N/cm. A graph in FIG. 20 illustrates a relationship between the upper limit value and the lower limit value of the interfacial tension T as to the limit range of the liquid crystal filling amount M of each of the comparative example and the example and the surface area increase rate R which is indicated in FIG. 13. In FIG. 20, plots of the example and plots of the comparative example are respectively indicated by "●" and "▲". An approximation straight line is illustrated by a broken line in FIG. 20 on the basis of the respective plots related to the comparative example and the example. The approximation straight line expresses how the interfacial tension T which has an approximately middle value of the limit range of the liquid crystal filling amount M changes when the surface area increase rate R is changed. It is possible to say that the interfacial tension T which has the approximately middle value of the limit range of the liquid crystal filling amount M has a limit value with which the balance with respective to the liquid crystal filling amount M (gravity acting on the liquid crystal material) is able to be maintained and a maximum value of the interfacial tension actually generated in the interface between the liquid crystal layer and the inner surface of the CF substrate. The approximation straight line is a linear function with slope of "−102940" and intercept of "698 N/cm". The intercept of the approximation straight line indicates the limit value (maximum value) of the interfacial tension T when the surface area increase rate R is 0%, that is, when the surface of the overcoat film is a smooth surface in which no fine irregularity exists.

According to the approximation straight line illustrated in FIG. 20, it is possible to say that, as the surface area increase rate R increases, the limit value (maximum value) of the interfacial tension T tends to decreases. This means that, when the gap GP related to the fine irregularities generated on the surface of the overcoat film increases and the surface area increase rate R increases, the maximum value of the interfacial tension T actually generated in the interface between the liquid crystal layer and the inner surface of the CF substrate decreases, and the limit value of the interfacial tension T required for maintaining the balance with respect to the gravity acting on the liquid crystal material decreases. Moreover, in the example, compared with the comparative example, the surface area increase rate R is low, so that the limit value of the interfacial tension T, with which the balance with respect to the gravity acting on the liquid crystal material is able to be maintained, is relatively great. Accordingly, it is possible to say that, in the example, compared with the comparative example, gravity-originated unevenness is difficult to be generated even when the liquid crystal filling amount M is large, and the proper range of the liquid crystal filling amount M is wide. Moreover, it is possible to say that, in the example, compared with the comparative example, a difference between the upper limit value and the lower limit value of the interfacial tension T as to the limit range of the liquid crystal filling amount M is small, so that an individual difference of a product is small and stable quality is obtained.

As described above, the liquid crystal panel 10 of the present embodiment includes: the liquid crystal layer 10C; the pair of substrates 10A and 10B that hold the liquid crystal layer 10C therebetween; the spacer 12 that is formed so as to protrude from the CF substrate (one substrate) 10A of the pair of substrates 10A and 10B toward the array substrate (the other substrate) 10B and comes into contact with the array substrate 10B to thereby keep the distance D between the pair of substrates 10A and 10B; and the overcoat film 19 that is arranged in the CF substrate 10A on a lower layer side of the spacer 12 and is configured so that the gap GP between the lowest position and the highest position of the fine irregularities generated in the reference range on the surface is 4 nm or less.

In this manner, the distance D between the pair of substrates 10A and 10B is kept when the spacer 12 that is formed so as to protrude from the CF substrate 10A toward the array substrate 10B comes into contact with the array substrate 10B. When the spacer 12 keeps the distance D between the pair of substrates 10A and 10B, the thickness of the liquid crystal layer 10C that is held between the pair of substrates 10A and 10B is stably kept. The distance D between the pair of substrates 10A and 10B may vary in accordance with the filling amount of the liquid crystal material (liquid crystal filling amount M) which constitutes the liquid crystal layer 10C, so that, when the filling amount of the liquid crystal material becomes excessive and the distance D becomes too long compared with the protruding height A of the spacer 12, there is a possibility that, when the liquid crystal panel 10 is stood, the liquid crystal material is gathered in the lower end side of the liquid crystal panel 10 due to gravity and a display defect is thereby caused. On the contrary, when the filling amount of the liquid crystal material is insufficient and the distance D is too short compared with the protruding height A of the spacer 12, there is a possibility that a bubble is generated due to thermal shrinkage of the liquid crystal material in a low temperature environment. There is the proper range of the filling amount of the liquid crystal material, in which neither the problem of the liquid crystal pool nor the problem of the bubble each of which is described above is not caused, and, as the proper range is wider, variation which is related to the filling amount of the liquid crystal material and results from a manufacturing condition or the like is allowed more, so that there is a tendency that the wider proper range is suitable for achieving improvement of the non-defective rate and the like.

Here, generation of the fine irregularities on the surface of the overcoat film 19 that is arranged in the CF substrate 10A of the pair of substrates 10A and 10B on the lower layer side of the spacer 12 is inevitable, and the irregularities have a great influence on the surface area related to the interface in the CF substrate 10A with the liquid crystal layer 10C. The overcoat film 19 is configured so that the gap GP between the lowest position and the highest position of the fine irregularities generated in the reference range on the surface is 4 nm or less. When it is assumed that the gap GP exceeds 4 nm, the surface area related to the interface of the CF substrate 10A with the liquid crystal layer 10C becomes too large, so that the interfacial tension T generated in the interface of the CF substrate 10A with the liquid crystal layer 10C is caused to be reduced, resulting in that the problem of the liquid crystal pool is easily caused. On the other hand, when it is set that the gap GP is 4 nm or less, the surface area related to the interface of the CF substrate 10A with the liquid crystal layer 10C is kept sufficiently small, so that the interfacial tension T generated in the interface of the CF substrate 10A with the liquid crystal layer 10C is sufficiently secured. Accordingly, even in the case where the liquid crystal panel 10 is stood, the liquid crystal material included in the liquid crystal layer 10C is able to resist gravity with the sufficient interfacial tension T, so that the situation where the liquid crystal material is gathered in the lower end side of the liquid crystal panel 10 is difficult to be caused. Since it is thereby possible to set the proper range related to the filling amount of the liquid crystal material to be wide, the gap GP which is 4 nm or less is suitable for achieving improvement of the non-defective rate and the like.

Moreover, the overcoat film 19 is configured so that the surface area increase rate which is obtained by dividing the actually measured surface area in the reference range by the assumed surface area when the reference range is assumed to be a smooth surface and then subtracting 1 from the value obtained by the division is 0.071% or less. The assumed surface area obtained by assuming that the reference range on the surface of the overcoat film 19 is the smooth surface in which no fine irregularity exists is the theoretically minimum surface area in the reference range. On the contrary, on the actual surface of the overcoat film 19, the fine irregularities are generated, so that the actually measured surface area obtained by actually measuring the reference range is larger than the assumed surface area by the amount of the irregularities. Moreover, there is a tendency that, as the gap GP related to the irregularities becomes greater, the surface area increase rate that is obtained by dividing the actually measured surface area by the assumed surface area and then subtracting 1 from the value obtained by the division becomes greater. Here, when it is assumed that the surface area increase rate obtained by dividing the actually measured surface area by the assumed surface area and then subtracting 1 from the value obtained by the division exceeds 0.071%, the gap GP related to the fine irregularities generated on the surface of the overcoat film 19 becomes too great and the surface area in the reference range becomes too large, so that the interfacial tension T generated in the interface of the CF substrate 10A with the liquid crystal layer 10C is reduced, resulting in that the problem of the liquid crystal pool is easily caused. On the other hand, when the surface area increase rate obtained by dividing the actually measured surface area by the assumed surface area and then subtracting 1 from the value obtained by the division is set to be 0.071% or less, the gap GP related to the fine irregularities generated on the surface of the overcoat film 19 is set to be sufficiently small and the surface area in the reference range is set to be sufficiently small, so that the interfacial tension T generated in the interface of the CF substrate 10A with the liquid crystal layer 10C is sufficiently secured. Thereby, the problem of the liquid crystal pool is difficult to be caused.

In addition, the overcoat film 19 is formed of the ultraviolet-curable resin material. When it is assumed that the overcoat film 19 is formed of epoxy resin that is one of thermosetting resin materials, a contained thermosetting agent occupies a great volume, so that a local convex portion is easily formed and the convex may cause the gap GP to exceed 4 nm. On the other hand, when the overcoat film 19 is formed of the ultraviolet-curable resin material, formation of the local convex portion as above is suppressed. Thereby, certainty that the gap GP related to the fine irregularities generated on the surface of the overcoat film 19 is 4 nm or less is increased, and it is possible to make it difficult to cause the problem of the liquid crystal pool.

Further, the CF-side optical alignment film (optical alignment film) 21 that is arranged on the upper layer side of the overcoat film 19 and the spacer 12 so as to face the liquid crystal layer 10C and that is subjected to optical alignment treatment so that the liquid crystal molecules included in the liquid crystal layer 10C are aligned is included. By being subjected to the optical alignment treatment, the CF-side optical alignment film 21 is able to align the liquid crystal molecules included in the liquid crystal layer 10C. Compared with the case where an alignment film subjected to rubbing treatment is used, the CF-side optical alignment film 21 is easily influenced by the state of the surface of the overcoat film 19 serving as the base, so that irregularities similar to the fine irregularities generated on the surface of the overcoat film 19 are easily generated on the surface of the CF-side optical alignment film 21. Since the overcoat film 19 serving as the base of the CF-side optical alignment film 21 as above is configured so that the gap GP between the lowest position and the highest position of the fine irregularities generated in the reference range on the surface is 4 nm or less, the gap GP related to the fine irregularities generated on the surface of the CF-side optical alignment film 21 is also sufficiently small. Thereby, the problem of the liquid crystal pool is difficult to be caused.

OTHER EMBODIMENTS

The disclosure is not limited to the embodiment described by the above description and the drawings, and, for example, the following embodiments are also included in a technical range of the disclosure.

(1) Although a case where the spacer is provided only on a CF substrate side is described in the aforementioned embodiment, the spacer may be provided in both of the CF substrate and the array substrate. In this case, both spacers may be arranged in an overlapping manner so that the spacer on the CF substrate side comes into contact with the spacer on the array substrate side, but may not be necessarily limited thereto.

(2) Although a case where only one type of protruding height of the spacer is provided is exemplified in the aforementioned embodiment, a plurality of types of spacers protruding heights of which are different may be provided in the CF substrate.

(3) Although a case where the optical alignment film is formed of the optical alignment film material of the photo-decomposition type is described in the aforementioned embodiment, the optical alignment film may be formed of an optical alignment film material of a photoisomerization type or an optical alignment film material of a photo-crosslinking type.

(4) In addition to the aforementioned embodiment, a specific material used for the overcoat film is able to be changed as appropriate. Moreover, a specific numerical value of a film thickness of the overcoat film is able to be changed as appropriate. In accordance with such change of the material or the film thickness of the overcoat film, a wavelength or a total dose of ultraviolet rays radiated for curing the overcoat film may be also appropriately changed.

(5) In addition to the aforementioned embodiment, a specific material used for the optical alignment film is able to be changed as appropriate. Moreover, a specific numerical value of a film thickness of the optical alignment film is able to be changed as appropriate. In accordance with such change of the material or the film thickness of the optical alignment film, a wavelength or a total dose of ultraviolet rays radiated to the optical alignment film for performing optical alignment treatment may be also appropriately changed, and a temperature environment and a baking time of baking that is performed after the radiation of the ultraviolet rays may be also appropriately changed.

(6) Although a case where the irregularities on the surface of the overcoat film were measured by using the atomic force microscope which is one of scanning probe microscopes is described in the comparative experiment 1 of the aforementioned embodiment, the irregularities on the surface of the overcoat film are able to be measured also by using another type of scanning probe microscope, for example, such as a scanning tunneling microscope. In addition thereto, specific equipment used for measurement, examination, or the like that is performed in each comparative experiment is able to be changed as appropriate.

(7) Although a case where a liquid crystal material (positive liquid crystal material) anisotropy of a dielectric constant of which is positive is used as the liquid crystal material of the liquid crystal layer is described in the aforementioned embodiment, a liquid crystal material (negative liquid crystal material) anisotropy of a dielectric constant of which is negative is also able to be used as the liquid crystal material of the liquid crystal layer.

(8) Although a case where a display mode of the liquid crystal panel is the FFS mode is exemplified in the aforementioned embodiment, the display mode of the liquid crystal panel may be a TN mode, a VA mode, an IPS mode, or the like.

(9) Although the liquid crystal panel of a transmissive type is described in the aforementioned embodiment, a liquid crystal panel of a reflection type or a liquid crystal panel of a transflective type may be provided.

The present disclosure contains subject matter related to that disclosed in Japanese Priority Patent Application JP 2019-074115 filed in the Japan Patent Office on Apr. 9, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal panel comprising:
   a liquid crystal layer;
   a pair of substrates that hold the liquid crystal layer between the pair of substrates;
   a spacer that is formed so as to protrude from one substrate of the pair of substrates toward another substrate of the pair of substrates and comes into contact with the other substrate to keep a distance between the pair of substrates; and
   an overcoat film that is arranged in the one substrate on a lower layer side of the spacer and is configured so that a gap between a lowest position and a highest position of fine irregularities generated in a reference range on a surface is 4 nm or less, wherein
   the overcoat film is configured so that a surface area increase rate that is obtained by dividing an actually measured surface area in the reference range by an assumed surface area when the reference range is assumed to be a smooth surface and subtracting 1 from a value obtained by division is 0.071% or less.

2. The liquid crystal panel according to claim 1, wherein the overcoat film is formed of an ultraviolet-curable resin material.

3. The liquid crystal panel according to claim 1, further comprising an optical alignment film that is arranged on an upper layer side of the overcoat film and the spacer so as to face the liquid crystal layer and that is subjected to optical alignment treatment so that liquid crystal molecules included in the liquid crystal layer are aligned.

* * * * *